US005317909A

United States Patent [19]

Yamada et al.

[11] Patent Number: 5,317,909

[45] Date of Patent: Jun. 7, 1994

[54] ABNORMALITY DETECTING APPARATUS FOR USE IN FUEL TRANSPIRATION PREVENTION SYSTEMS

[75] Inventors: Jun Yamada, Nagoya; Shuji Sakakibara, Okazaki; Yoshihiro Okuda; Tomomi Eino, both of Kariya; Hisashi Iida, Aichi; Kiyoshi Nagata, Anjo; Toshihiro Suzumura, Nagoya, all of Japan

[73] Assignee: Nippondenso Co., Ltd., Kariya, Japan

[21] Appl. No.: 862,507

[22] Filed: Apr. 2, 1992

[30] Foreign Application Priority Data

Apr. 2, 1991 [JP] Japan ................................ 3-070001
Apr. 18, 1991 [JP] Japan ................................ 3-087005
Sep. 13, 1991 [JP] Japan ................................ 3-234761

[51] Int. Cl.$^5$ ........................................ G01M 19/00
[52] U.S. Cl. ................................ 73/118.1; 123/520
[58] Field of Search .................. 73/118.1; 364/431.03; 123/518, 519, 520

[56] References Cited

U.S. PATENT DOCUMENTS 4,667,514 5/1987 Baer .......................... 73/DIG. 3 X
4,794,790 1/1989 Margarit-Metaxa et al. ..... 73/117.3
4,949,695 8/1990 Uranishi et al. .................... 123/522
5,085,197 2/1992 Mader et al. .................. 123/518 X
5,105,789 4/1992 Aramaki et al. .................... 123/520
5,146,902 9/1992 Cook et et. .................... 73/118.1 X
5,182,945 2/1993 Setter ................................ 73/118.1

FOREIGN PATENT DOCUMENTS 226754 2/1990 Japan .
2102360 4/1990 Japan .
2130255 5/1990 Japan .
326862 2/1991 Japan .

*Primary Examiner*—Jerry W. Myracle
*Attorney, Agent, or Firm*—Cushman, Darby & Cushman

[57] ABSTRACT

An apparatus for detecting an abnormality of a fuel transpiration prevention system which includes a canister with an absorbing device and a control valve provided in a passage between a fuel tank and an intake pipe of an internal combustion engine so that a fuel gas generated within the fuel tank is absorbed by the absorbing device of the canister and introduced into the intake pipe by opening and closing the control valve in accordance with an operating state of said internal combustion engine. The apparatus includes a pressure detecting device for detecting a pressure within the fuel tank and a deviation calculating unit responsive to the output of the pressure detecting device for calculating a deviation between the pressure detected when the control valve opens the passage and the pressure detected when the control valve closes the passage. The apparatus decides an abnormality of the fuel gas supply system on the basis of the deviation calculated by the deviation calculating unit. This arrangement allows accurate abnormality detection throughout the fuel transpiration prevention system.

18 Claims, 21 Drawing Sheets

ABNORMALITY DETECTING APPARATUS FOR USE IN FUEL TRANSPIRATION PREVENTION SYSTEMS

BACKGROUND OF THE INVENTION

The present invention relates to fuel transpiration prevention systems for preventing transpiration of fuel gases generated in a fuel supply system of a motor vehicle, and more particularly to an abnormality detecting apparatus for use in such a fuel transpiration prevention system for detecting an abnormality in terms of supply (purge) of a fuel gas to be fed into an intake pipe coupled to an internal combustion engine.

In systems for preventing discharge of fuel gas to the atmosphere, a fuel transpiration preventing system there is generally known whereby fuel gas generated in a fuel tank is absorbed by an absorbing device provided within a canister and, thereafter, introduced into an intake pipe in accordance with the engine operating condition, together with air sucked through an atmosphere-communicating opening of the canister in response to the negative pressure within the intake pipe. One major problems arising in the use of such a fuel transpiration system relates to a clogging accident of a passage between the canister and the intake pipe. The clogging accident causes the canister to be filled with the fuel gas so that the fuel gas is finally discharged through the atmosphere-communicating opening into the atmosphere due to its own pressure. Moreover, in case that the passage between the canister and the intake pipe is broken, there is the possibility that the fuel gas is discharged through the broken portion into the atmosphere. One possible solution is to provide a pressure sensor within the passage between the canister and the intake pipe so as to detect the abnormality in the supply of the fuel gas in the intake pipe on the basis of the detection result of the pressure sensor, as disclosed in the Japanese Patent Provisional Publication No. 2-130255. However, this arrangement has a disadvantages in that it is impossible to detect the abnormalities such as clogging and damages of an intake passage between the canister and the fuel tank. In addition, there is a problem in that the detection value of the pressure sensor becomes larger as the amount of the fuel gas absorbed to the absorbing device is increased as a result, the detection result varies in accordance with the amount of the fuel gas absorbed to the absorbing device. This problem thereby makes it difficult to accurately detect the abnormalities on supply of the fuel gas.

SUMMARY OF THE INVENTION

It is therefore an object of the present invention to provide an abnormality detecting apparatus for a fuel transpiration preventing system which is capable of accurately and widely detecting supply abnormalities of all intake passages between the fuel tank and the intake pipe.

One of features of the present invention is that fuel gas generated in a fuel tank is supplied through a first supply passage so as to be absorbed by an absorbing device provided within a canister and the canister is communicated with an intake pipe with a control valve being opened in accordance with an operating condition of an internal combustion engine so that the fuel gas absorbed by the absorbing device is led through a second supply passage into the intake pipe. At this time, the pressure within the fuel tank is detected by a pressure detecting means so as to detect, on the basis of the detection result, an abnormality on supply of the fuel gas into the intake pipe due to at least one of abnormalities of the canister, first supply passage, second supply passage, control valve and fuel tank.

In accordance with the present invention, there is provided a fuel transpiration preventing system for preventing transpiration of a fuel gas generated from a fuel encased within a liquid fuel tank to be supplied to an internal combustion engine, the apparatus comprising: a fuel gas supply system including: canister means encasing an absorbing device for absorbing the fuel gas generated within the fuel tank; first passage means provided between the canister and the fuel tank for introducing the fuel gas from the fuel tank to the canister means; second passage means provided between the canister and an intake pipe of the internal combustion engine for leading the fuel gas absorbed by the absorbing device into the intake pipe of the internal combustion engine due to a negative pressure generated within the intake pipe; and valve means provided in the second passage means for opening and closing the second passage in accordance with an operating condition of the internal combustion engine; pressure detecting means for detecting a pressure within the fuel tank to generate an signal indicative of the detected pressure; deviation calculating means responsive to the signal generated from the pressure detecting means for calculating an deviation between the pressure detected when the valve means opens the second passage means and the pressure detected when the valve means closes the second passage means; and abnormality decision means for deciding an abnormality of the fuel gas supply system on the basis of the deviation calculated by the deviation calculating means.

In accordance with the present invention, there is also provided a fuel transpiration preventing system for preventing transpiration of a fuel gas generated from a fuel encased within a liquid fuel tank to be supplied to an internal combustion engine, the system comprising: pressure detecting means for detecting a pressure within the fuel tank; canister means encasing an absorbing device for absorbing the fuel gas generated within the fuel tank; first supply passage means for introducing the fuel gas from the fuel tank to the canister means; pressure adjusting valve means for keeping a pressure within the canister in a predetermined range; second supply passage means for leading the fuel gas absorbed by the absorbing device into an intake pipe of the internal combustion engine; control valve means provided within the second supply passage means and arranged to open and close in accordance with an operating condition of the internal combustion engine; and supply abnormality detecting means for detecting an abnormality on supply of the fuel gas to the intake pipe due to an abnormality of at least one of the canister, the first supply passage means, the second supply passage means, the control valve means and the fuel tank, on the basis of detection results of the pressure detecting means obtained when the control valve means takes opening and closing states.

According to the present invention, there is provided a fuel transpiration preventing system for preventing transpiration of a fuel gas generated from a fuel encased within a liquid fuel tank to be supplied to an internal combustion engine, the apparatus comprising: a fuel gas supply system including: canister means encasing an absorbing device for absorbing the fuel gas generated within the fuel tank and further having an opening communicated with atmosphere; first passage means provided between the canister and the fuel tank for introducing the fuel gas from the fuel tank to the canister means; second passage means provided between the canister and an intake pipe of the internal combustion engine for leading the fuel gas absorbed by the absorbing device into the intake pipe of the internal combustion engine due to a negative pressure generated within the intake pipe; and first valve means provided in the second passage means for opening and closing the second passage in accordance with an operating condition of the internal combustion engine; pressure detecting means for detecting a pressure within the fuel tank to generate an signal indicative of the detected pressure; second valve means for opening and closing the atmosphere-communicated opening of the canister; deviation calculating means responsive to the signal generated from the pressure detecting means for calculating an deviation between the pressure detected when the first valve means opens the second passage means and the second valve means opens the atmosphere-communicated opening and the pressure detected when the first valve means opens the second passage means and the second valve means closes the atmosphere-communicated opening; and abnormality decision means for deciding an abnormality of the fuel gas supply system on the basis of the deviation calculated by the deviation calculating means.

Further, according to this invention, there is provided a fuel transpiration preventing system for preventing transpiration of a fuel gas generated from a fuel encased within a liquid fuel tank to be supplied to an internal combustion engine, the apparatus comprising: a fuel gas supply system including: canister means encasing an absorbing device for absorbing the fuel gas generated within the fuel tank; first passage means provided between the canister and the fuel tank for introducing the fuel gas from the fuel tank to the canister means; second passage means provided between the canister and an intake pipe of the internal combustion engine for leading the fuel gas absorbed by the absorbing device into the intake pipe of the internal combustion engine due to a negative pressure generated within the intake pipe; and valve means provided in the second passage means for opening and closing the second passage in accordance with an operating condition of the internal combustion engine; pressure detecting means for detecting a pressure within the fuel tank to generate an signal indicative of the detected pressure; bypass control means provided between the first and second passage means for allowing a direct communication between first and second passage means to be established so as to by-pass the canister; deviation calculating means responsive to the signal generated from the pressure detecting means for calculating an deviation between the pressure detected when the valve means opens the second passage means and the bypass control means bypasses the canister and the pressure detected when the valve means opens the second passage means and the bypass control means does not by-pass the canister; and abnormality decision means for deciding an abnormality of the fuel gas supply system on the basis of the deviation calculated by the deviation calculating means.

In addition, according to this invention, there is provided an apparatus for detecting an abnormality of a fuel transpiration preventing system which includes a canister with an absorbing device and a control valve provided in a passage between a fuel tank and an intake pipe of an internal combustion engine so that a fuel gas generated within the fuel tank is absorbed by the absorbing device of the canister and introduced into the intake pipe by opening and closing the control valve in accordance with an operating state of the internal combustion engine, the apparatus comprising: pressure detecting means for detecting a pressure within the fuel transpiration preventing system; switching valve means for opening and closing an opening of the canister which communicates with atmosphere; sealing means for closing both the control valve and switching valve means so as to seal the fuel transpiration preventing system; pressure adjusting means for adjusting a pressure within the sealed fuel transpiration preventing system to predetermined pressures; pressure variation detecting means responsive to an output of the pressure detecting means for detecting predetermined pressure variation states while the pressure adjusting means adjusts the pressure within the sealed system or after the pressure adjusting means has adjusted the pressure within the sealed system; and abnormality detecting means for detecting an abnormality of the fuel transpiration preventing system on the basis of the predetermined pressure variation state detected by the pressure variation detecting means.

Preferably, the pressure adjusting means selectively adjusts the pressure within the sealed system to a first predetermined pressure and a second predetermined pressure, the pressure variation detecting means detects a first pressure variation state after the pressure within the sealed system is adjusted to the first predetermined pressure and further detects a second pressure variation state after the pressure within the sealed system is adjusted to the second predetermined pressure, and the abnormality detecting means compares the first pressure variation state with the second pressure variation state to detect the abnormality of the fuel transpiration preventing system on the basis of a comparison result between the first and second pressure variation states. Further, the pressure adjusting means introduces a negative pressure from the intake pipe into the fuel transpiration preventing system, the pressure variation detecting means detects a pressure variation state when the negative pressure is introduced thereinto, and the abnormality detecting means detects the abnormality of the fuel transpiration preventing system on the basis of the pressure variation state detected when the negative pressure is introduced thereinto.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1A:
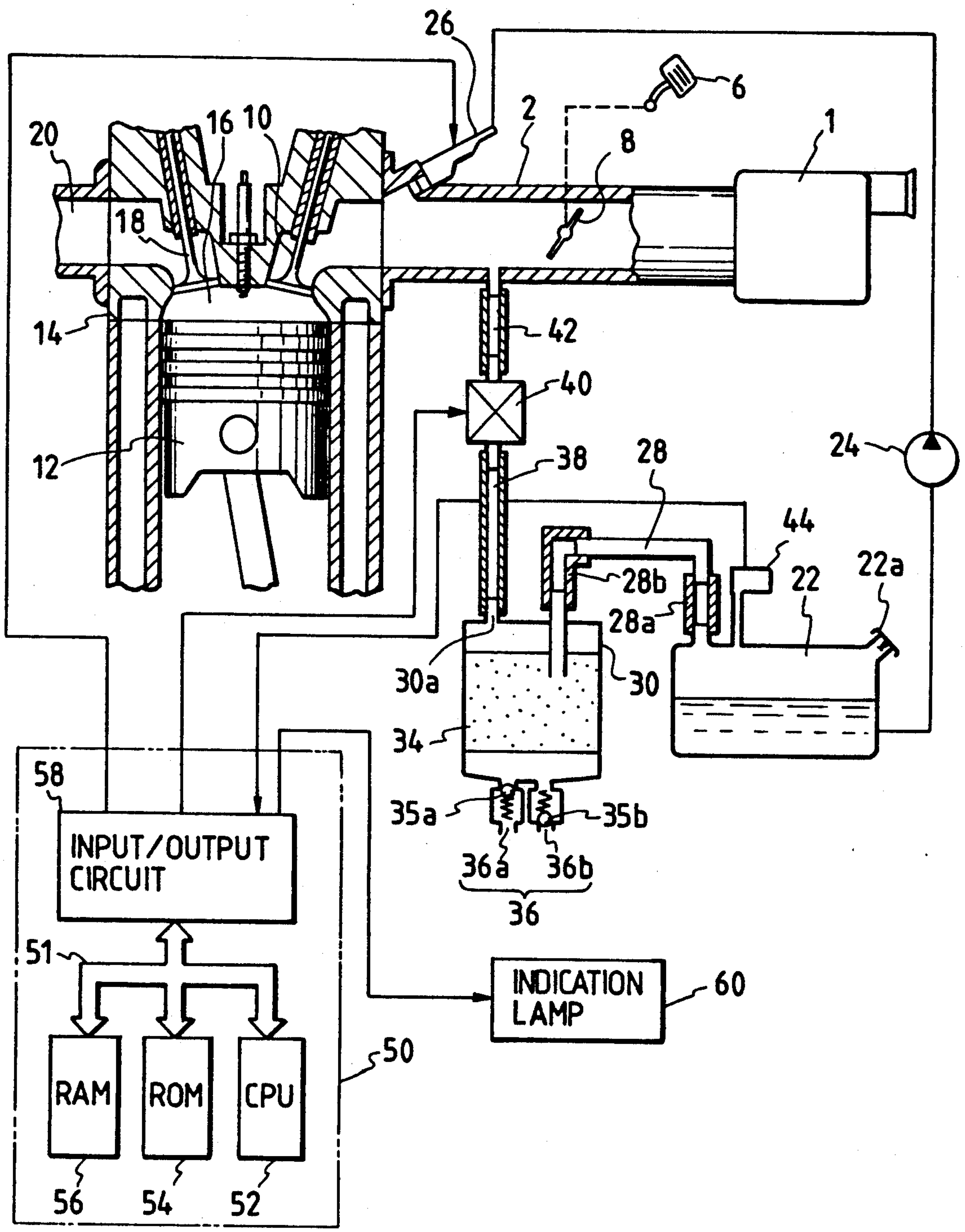
FIG. 1A shows an entire arrangement of an abnormality detecting apparatus for a fuel transpiration preventing system according to a first embodiment of the present invention.

A first embodiment of the present invention will be described hereinbelow with reference to FIG. 1A showing an entire arrangement of an abnormality detecting apparatus for a fuel transpiration preventing system of the first embodiment which is provided in connection with an internal combustion engine of a motor vehicle. In FIG. 1A, air sucked through an air cleaner 1 for air purification is supplied into a combustion chamber 16 formed by an internal combustion engine body 14 and a piston 12 after passing through an intake pipe 2 coupled to the air cleaner 2. Within the intake pipe 2 there is provided a throttle valve 8 openable and closable in connection with an accelerating pedal 6 so as to control the suction amount of the air. Further, at the boundary portion between the intake pipe 2 and the combustion chamber 16 there is rotation of a cam shaft, not shown. In addition, the combustion chamber 16 is also coupled through an exhaust valve 18 to an exhaust pipe 20, the exhaust valve 18 being arranged so as to be openable and closable in response to the rotation of a cam shaft, not shown, as well as the intake valve 10. The gas generated in the combustion chamber 16 in the explosion stroke of the engine is discharged therefrom through the exhaust pipe 20.

On the other hand, liquid fuel stored in a fuel tank 22 is picked up by means of a fuel pump 24 and supplied, under pressure, to an injector 26 provided within the intake pipe 2. The injector 26 is for supplying fuel into the combustion chamber 16 by an optimal fuel injection amount and at an optimal injection timing on the basis of a calculation by an electronic control unit 50 which will be described hereinafter. Further, in relation to the fuel tank 22 there is provided a pressure sensor 44 acting as a pressure detecting means to detect the pressure within the fuel tank 22, and a communication pipe 28 connected to the fuel tank 22 and acting as the first supply passage. This communication pipe 28 is equipped with a fuel-tank connection pipe 28*a* and a canister connection pipe 28*b* which are constructed with flexible members such as a rubber hose and a nylon hose provided between the communication pipe 28 and the fuel tank 22 and between the communication pipe 28 and the canister 30. The fuel gas generated from the fuel within the fuel tank 22 is introduced through the communication pipe 28 into the canister 30. Within the canister 30 there is provided an absorbing device 34 having therein an activated carbon. The absorbing device 34 is for absorbing hazardous components of the fuel gas. Here, the communication pipe 28 is so arranged as to be slightly inserted into the absorbing device 34. In FIG. 1A, numeral 22*a* designates a relief valve which is arranged such that the pressure within the fuel tank 22 is released when the pressure exceeds a predetermined value (for example, −40 mmHg to 150 mmHg). Thus, the pressure between the fuel tank 22 and the canister 30 is always limited to within a predetermined range.

Furthermore, at one end portion of the canister 30 there is formed an atmosphere-communicating portion 36 whereby the absorbing device 34 can be coupled to the atmosphere. The opening assembly 36 comprises a first opening 36*a* encasing a first pressure adjusting valve 35*a* openable toward the atmosphere and a second opening 36*b* encasing a second pressure adjusting valve 35*b* openable toward the absorbing device 34.

This valve arrangement can keep the pressure within the canister 30 to an accurate detected pressure within the fuel tank 22 by means of the pressure sensor 44. When the pressure within the canister 30 and the fuel tank 22 exceeds a predetermined pressure Pa (for example, 15 mmHg), a portion of the pressure adjusting valve 35*a* is pushed up due to the pressure so that the pressure adjusting valve 35*a* takes the opening state. On the other hand, in cases where a control valve 40 (which will be described hereinafter) is in the opening state and the pressure within the canister 30 and the fuel tank 22 becomes a negative pressure below a predetermined pressure Pb (for example, −15 mmHg), a portion of the pressure adjusting valve 35*b* is pushed up due to the atmosphere pressure so that the pressure adjusting valve 35*b* takes the opening state.

In addition, at the other end portion of the canister 30 there is provided a hose connecting portion 30*a* connected to one end portion of a supply pipe 38 acting as a portion of the second supply passage. The other end portion of the supply pipe 38 is coupled to one end portion of the control valve (solenoid valve) 40, the other end portion of which is connected to one end portion of a supply pipe 42 also acting as a portion of the second supply passage where, the other end portion of the supply pipe 42 is connected to the intake pipe 2. That is, the canister is coupled through the control valve 40 to the intake pipe 2. Here, the supply pipes 38 and 42 are respectively constructed with flexible members such as a rubber hose and a nylon hose. The control valve 40 is openable and closable in accordance with control signals from the electronic control unit 50 so as to establish and cut the communication between the canister 30 and the intake pipe 2.

Figure 1B:
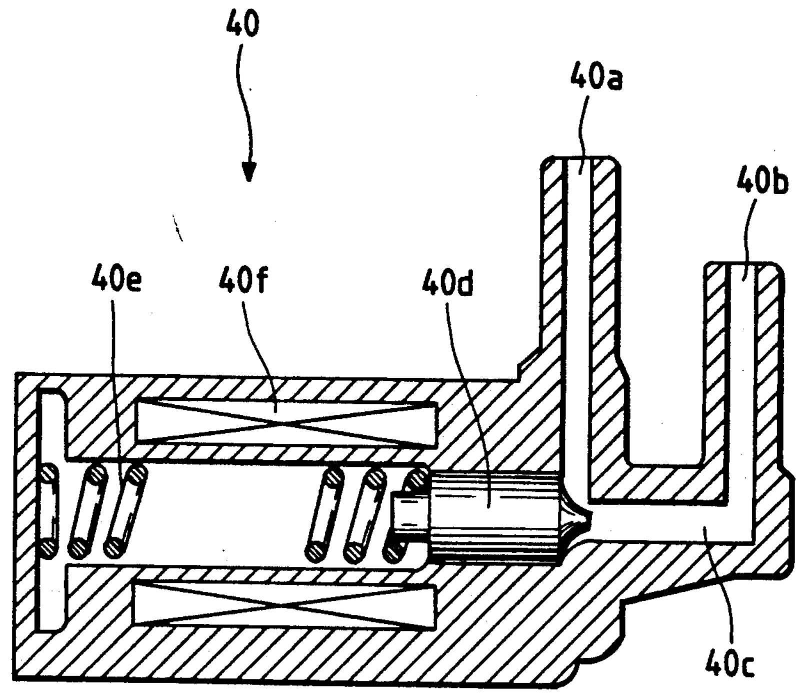
FIG. 1B shows one example of the arrangement of a control valve to be used in the FIG. 1A abnormality detecting apparatus.
Figure 1C:
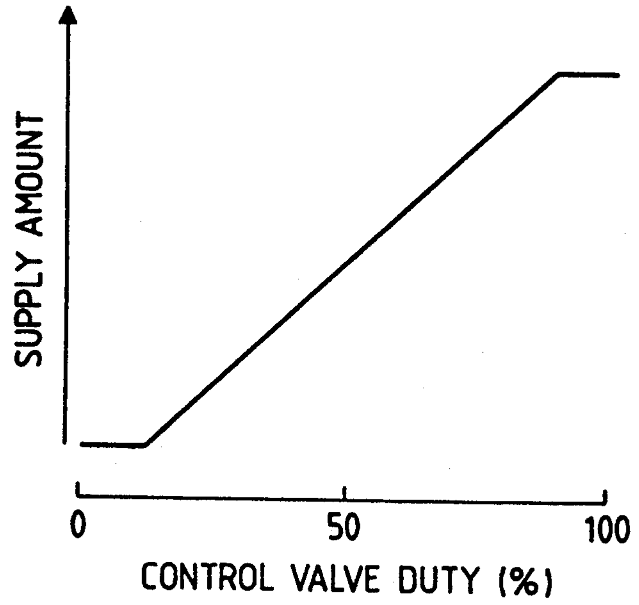
FIG. 1C is a graphic diagram showing the relation between a fuel gas supply amount and a control valve drive duty.

FIG. 1 B shows one example of the arrangement of the control valve 40. In FIG. 1B, the control valve 40 is arranged so as to be coupled through a canister side port 40*a* to the supply pipe 38 and coupled through an intake-pipe side port 40*b* to the other supply passage 42, the ports 40*a* and 40*b* being coupled through a passage 40*c* to each other. The control valve 40 is equipped with a valve body 40*d* which is biased by a spring 40*e* and movable against the biasing force of the spring 40*e* by energization of a coil 40*f* for opening and closing the passage 40*c*. If required, this arrangement can control the supply amount of the fuel gas from the canister 30 to the intake pipe 2 by changing the ratio (duty ratio) of the pulse width of a pulse voltage signal to be supplied to the coil 40*f* with respect to the period of the pulse voltage signal. FIG. 1C shows the relation between the control valve drive duty and the supply amount of the fuel gas.

The electronic control unit (which will be referred hereinafter to as ECU) 50 is constructed with a well-known control unit so as to set adequate control amounts for the fuel system and the ignition system on the basis of detections signals from various sensors, not shown, and to generate control signals for pertinently controlling the injector 26, the control valve 40, an igniting device (not shown) and others. Here, the various sensors include a throttle sensor, an idle switch, and a vehicle speed sensor for sensing the operation conditions of the internal combustion engine. The ECU 50 is provided with a well-known central processing unit (CPU) 52 for performing calculations and processings, a read-only memory (ROM) 54 for storing control programs and control constants necessary for the calculations, a random access memory (RAM) 56 for temporarily storing calculation data during the operation of the CPU 52, and an input/output circuit 58 for inputting and outputting signals from and to external devices. These units are coupled through a common bus 51 to each other. Moreover, the ECU 50 acts as a supply abnormality detecting means for making a decision, on the basis of the detection signal of the pressure sensor 44 and the operated (opened or closed) state of the control valve 40, as to whether the fuel gas is normally introduced into the intake pipe 2 without being transpired to the atmosphere. If an abnormality occurs, the ECU 50 lights an indication lamp 60.

Secondly, a description will be made hereinbelow in terms of an operation of the fuel transpiration prevention system for preventing the transpiration of the fuel gas to the atmosphere. The fuel gas generated within the fuel tank 22 is introduced through the communication pipe 28 into the canister 30 and the hazardous components (fuel vapor) of the fuel gas are absorbed by the absorbing device 34 within the canister 30. Thereafter, when the ECU 50 decides that the internal combustion engine takes a state that the fuel gas can be introduced into the intake pipe 2 (for instance, a state that the throttle valve 8 is opened by a degree greater than a predetermined opening degree), the control valve is operated to take the opening state. When the control valve 40 takes the opening state, the pressure adjusting valve 35*b* is opened due to the negative pressure within the intake pipe 2 so that new air is sucked into the canister 30. With new air being sucked into the canister 30, the hazardous components of the fuel gas absorbed by the absorbing device 34 are introduced, together with the new air, into the intake pipe 2, thereby allowing the repeated use of the absorbing device 34. The fuel gas introduced into the intake pipe 2 is burnt, together with fuel injected from the injector 26, within the combustion chamber 16. On the other hand, when the ECU 40 decides that the internal combustion engine takes a state that the fuel gas cannot be introduced into the intake pipe 2 (for instance, the state that the engine is in idling state), the control valve 40 is operated to take the closing state. In cases where the control valve 40 is in the closing state and the fuel gas is generated within the fuel tank 22, the pressure within the canister 30 and the fuel tank 22 increases. When the pressure within the fuel tank 22 exceeds the predetermined pressure Pa, the pressure adjusting valve 35*a* is opened so that the hazardous components of the fuel gas are discharged through the pressure adjusting valve 35*a* to the atmosphere after being absorbed by the absorbing device 34.

Accordingly, the provision of the two pressure adjusting valves 35*a* and 35*b* can cause the pressure within the canister 30 and the fuel tank 22 to be kept within a predetermined range.

Figure 2:
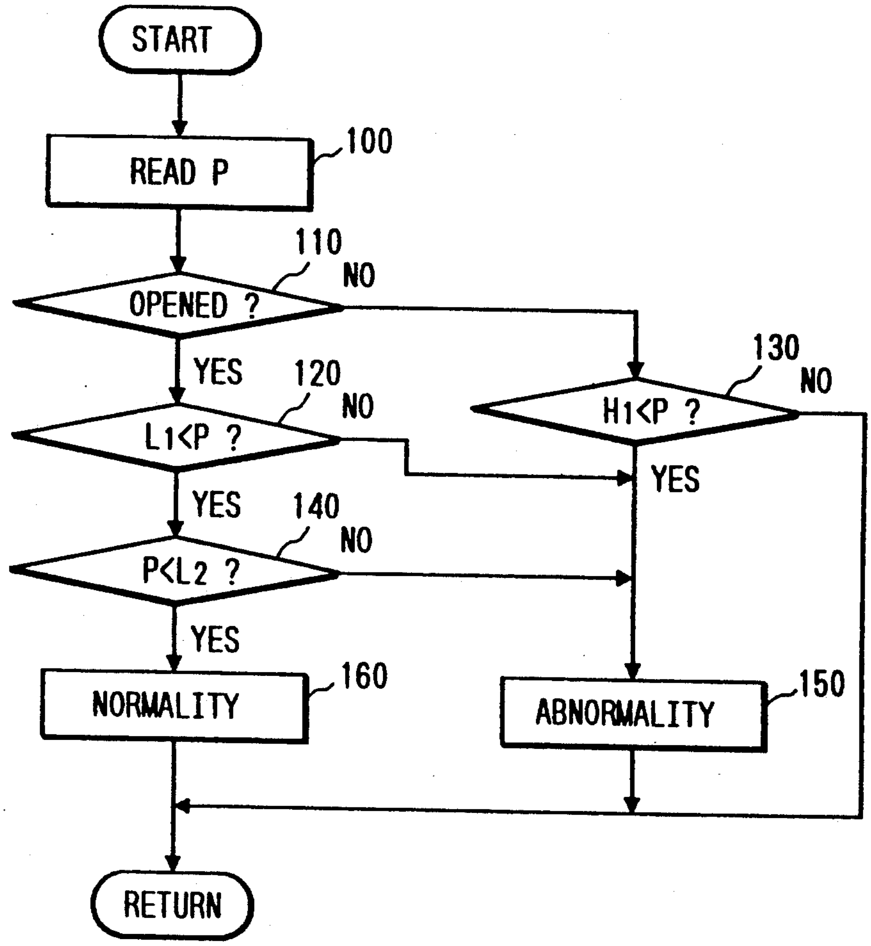
FIG. 2 is a flow chart for describing an operation for detecting an abnormality of the fuel transpiration preventing system according to the first embodiment of this invention.

FIG. 2 is a flow chart for describing an operation of the ECU 50 for detecting an abnormality of the fuel transpiration prevention system. This routine is executed at predetermined time intervals (for example, 60 ms) in response to the turning-on of a key switch, not shown. In FIG. 2, the operation starts with a step 100 to read the pressure P within the fuel tank 22 which is detected by the pressure sensor 44. The pressure P will be referred hereinafter as to tank internal pressure P. After the execution of the step 100, a step 110 follows to check whether the control valve 40 is now in the opening state. If in the opening state, the operational flow proceeds to step 120, and if not in the opening state, the operational flow goes to step 130. The step 120 is for checking whether the tank internal pressure P is higher than a predetermined value L1. If higher than the predetermined value L1, the operational flow advances to step 140. On the other hand, if lower than the predetermined value L1, the decision is made such that the pressure adjusting valve 35*b* does not operate normally, that is, the decision is made such that the pressure within the canister 30 becomes a negative pressure and the pressure adjusting valve 35*b* does not take the opening state irrespective of the negative pressure being below a predetermined pressure Pb, thereby proceeding to a step 150. Here, the predetermined value L1 is set to be slightly lower than the predetermined pressure Pb, for example, set to be −20 mmHg. Thereby causing the pressure adjusting valve 35*b* to take the opening state.

In the step 140 it is checked whether the tank internal pressure P is lower than a predetermined value L2. If the tank internal pressure P is lower than the predetermined value L2, control advances to a step 160, and if higher than the predetermined value L2, the decision is made such that the supply pipe 38 and the canister 30 are either disconnected from each other or a portion of the communication pipe 28, the canister 30, the fuel tank 22 or others are broken for some reason, thereby proceeding to the step 150. Here, the predetermined value L2 is set to be slightly higher than the predetermined pressure Pb causing the pressure adjusting valve 35*b* to take the opening state, for example, set to −10 mmHg. Thus, in the case that the control valve 40 is in the opening state, where the fuel transpiration prevention system normally operates, the tank internal pressure P should be substantially equal to the predetermined pressure Pb which causes the pressure adjusting valve 35*b* to take the opening state.

On the other hand, step 130 checks whether the tank internal pressure P is higher than a predetermined value H1. If the tank internal pressure P is higher than the predetermined value H1, the decision is made such that the communication pipe 28, the supply pipe 38 or others is in the clogged state or such that, for example, the pressure adjusting value 35*a* cannot take the opening state for some reason, thereby advancing to step 150. Contrary to this, if the tank internal pressure P is lower than the predetermined value H1, since the decision can be made such that the tank internal pressure P does not increase because the generated fuel gas being little, the operational flow returns to the main routine as it is without effecting the normal setting. Here, the predetermined value h1 is set to be sufficiently higher than the pressure value Pa, for example, set to be 30 mmHg, thereby causing the pressure adjusting value 35*a* to take the opening state In step 150, the abnormality setting is performed in relation to the above-mentioned abnormalities of the fuel transpiration prevention system, thereafter returning to the main routine. Here, for instance, the abnormality setting stores in the RAM 56 the information indicative of the occurrence of the abnormality, and a different routine (not shown) executes a well-known fail-safe operation that the information is read out from the RAM 56 to perform an accumulating calculation so that the indication lamp 60 turns on to inform the vehicle's user that an abnormality occurs when the abnormality settings is continuously effected above predetermined times (for example, 5 times).

On the other hand, in the step 140 the normality setting is effected on the basis of the decision that the fuel transpiration prevention system normally operates, thereafter returning to the main routine. Here, for instance, the normality setting is to store in the RAM 56 the information indicative of the normal operation of the fuel transpiration preventing system, and in a different routine the information is read out therefrom so as to reset the result value of the accumulating calculation.

Figure 3:
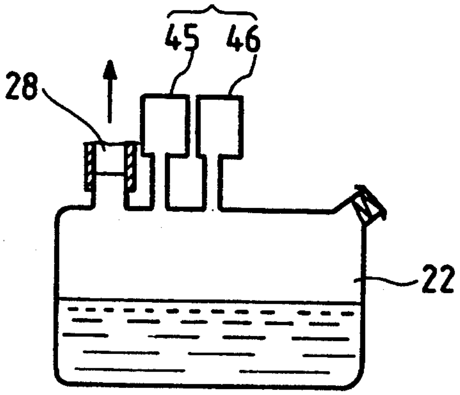
FIG. 3 is a cross-sectional view showing pressure switches within a fuel tank which act as a pressure detecting means.

Although in the above-described embodiment the pressure sensor 44 arranged to generate an output proportional to the pressure value is used as the pressure detecting means to decide the abnormality in a supply of the fuel gas to the intake pipe 2, it is appropriate that two pressure switches 45 and 46, each being illustrated in FIG. 3, are provided within the fuel tank 22 to decide the abnormality in the supply of the fuel gas to the intake pipe 2 on the basis of the outputs of the pressure switches. Here, the pressure switch 45 generates a high-level signal when the fuel exceeds a predetermined pressure (for example, 30 mmHg), and the pressure switch 46 generates a high-level signal when the fuel exerts a negative pressure below a predetermined pressure (for example, −10 mmHg).

Figure 4:
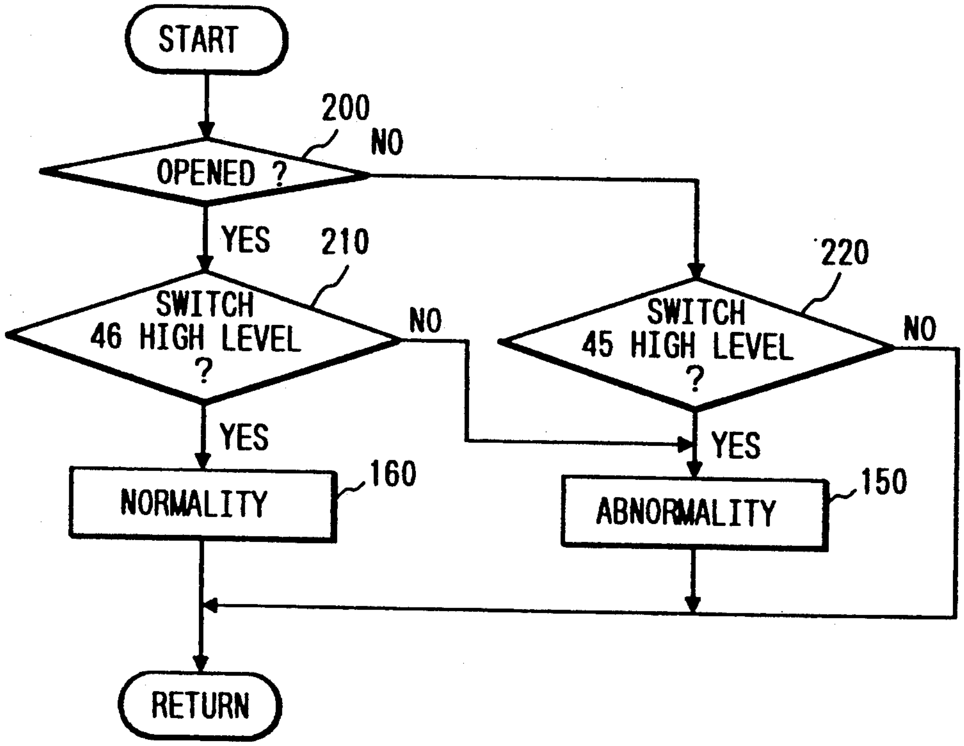
FIG. 4 is a flow chart for describing an abnormality detecting apparatus according to a second embodiment of this invention which performs an abnormality decision on the basis of output signals of the pressure switches illustrated in FIG. 3.

In addition, a description will be made hereinbelow with reference to a flow chart of FIG. 4 in terms of an abnormality detecting apparatus according to a second embodiment of this invention. The abnormality detecting apparatus according to the second embodiment performs the abnormality decision operation on the basis of the output signals of the two pressure switches as illustrated in FIG. 3. The routine shown in FIG. 4 will be executed at predetermined time intervals (for example, 60 ms) in response to the turning-on of the key switch, not shown, as well as the routine illustrated in FIG. 2. In FIG. 4, steps corresponding to those in FIG. 2 are marked with the same numerals and the description thereof will be omitted for brevity. This routine starts with a step 200 to check whether the control valve 40 is now in the opening state. If being in the opening state, the operational flow goes to a step 210, and if not in the opening state, the operational flow goes to a step 220. The step 210 is for checking whether the output signal of the pressure switch 46 is in the high-level state. If the answer of the step 210 is affirmative, the decision is made such that the fuel gas is normally introduced into the intake pipe 2, whereby the control goes to a step 160. If the answer of the step 210 is negative, the decision is made that an abnormality such as a disconnection of the communication pipe 28 has occurred, whereby the control goes to a step 150. On the other hand, in the step 220 it is checked whether the output signal of the pressure switch 45 is in the high-level state. If the answer of the step 220 is "YES", the decision is made that an abnormality such as clogging of the communication pipe 28 has occurred, thereby advancing to the step 150. If "NO", the decision can be made such that the pressure within the fuel tank 22 is not heightened because of little generation of the fuel gas, thereby returning to the main routine.

As described above, the supply abnormality detection can be made by the provision of the two pressure switches 45 and 46 in place of the pressure sensor 44, and further the structure of the pressure switches 45, 46 is simpler as compared with that of the pressure sensor 44 to thereby reduce the cost of the apparatus.

According to the above-described embodiments, since the decision as to whether the fuel transpiration prevention system normally operates is made on the basis of the detection of the pressure within the fuel tank 22, it is possible to decide the supply abnormalities on all the supply passage from the fuel tank 22 to the intake pipe 2, and further to accurately make the supply abnormality decision because the pressure value does not vary in accordance with the amount of the fuel gas absorbed by the absorbing device 34.

Furthermore, the pressure adjusting valves 35*a* and 35*b* provided in the atmosphere-communicating portion 36 of the canister 30 are control valves each being mechanically openable and closable in accordance with the pressure within the canister 30, and hence the structure thereof is relatively simple to make and easy to use. In addition, since the pressure adjusting valves 35*a* and 35*b* are not arranged to be electrically opened and closed, even if the ignition switch is in the OFF state, that is, even if the internal combustion engine is not started, when fuel gas generates to cause the pressure within the canister 30 exceed a predetermined pressure, the pressure adjusting valve 35*a* takes the opening state so as to prevent the pressure within the canister 30 or the fuel tank 22 from becoming high, thereby preventing the disconnection of the supply pipe 38 and others due to the heightening of the pressure.

Figure 5:
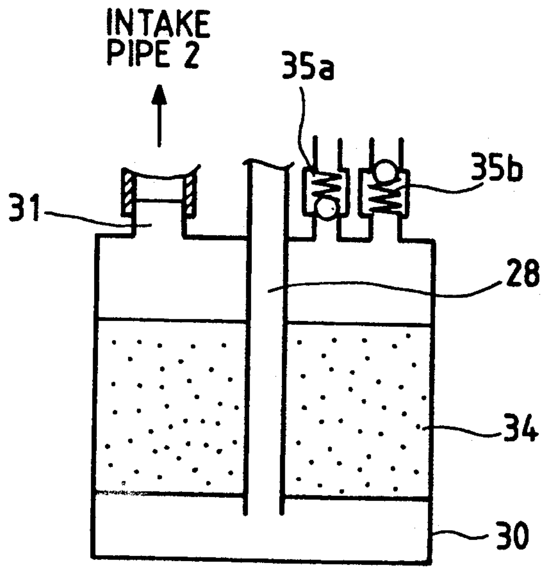
FIG. 5 is a cross-sectional view showing a different arrangement for keeping the pressure within a canister.

Although the above-described embodiments use the pressure adjusting valve that are mechanically openable and closable in accordance with the pressure within the canister 30 because of the aforementioned reason, it is also appropriate to use solenoid valves which are electrically openable and closable in accordance with the pressure within the canister 30. Further, although in the embodiments the pressure adjusting valves are provided at the lower portion of the canister 30, it is appropriate that, as illustrated in FIG. 5, the communication pipe 28 is arranged to penetrate the absorbing device 34 and the pressure adjusting valves 35*a* and 35*b* are disposed at an upper portion of the canister 30 with the lower portion of the canister 30 being closed. This arrangement does not give an adverse influence on the opening and closing operations of the pressure adjusting valves even if dust generated for some reason is accumulated at the lower portion of the canister 30.

Figure 6:
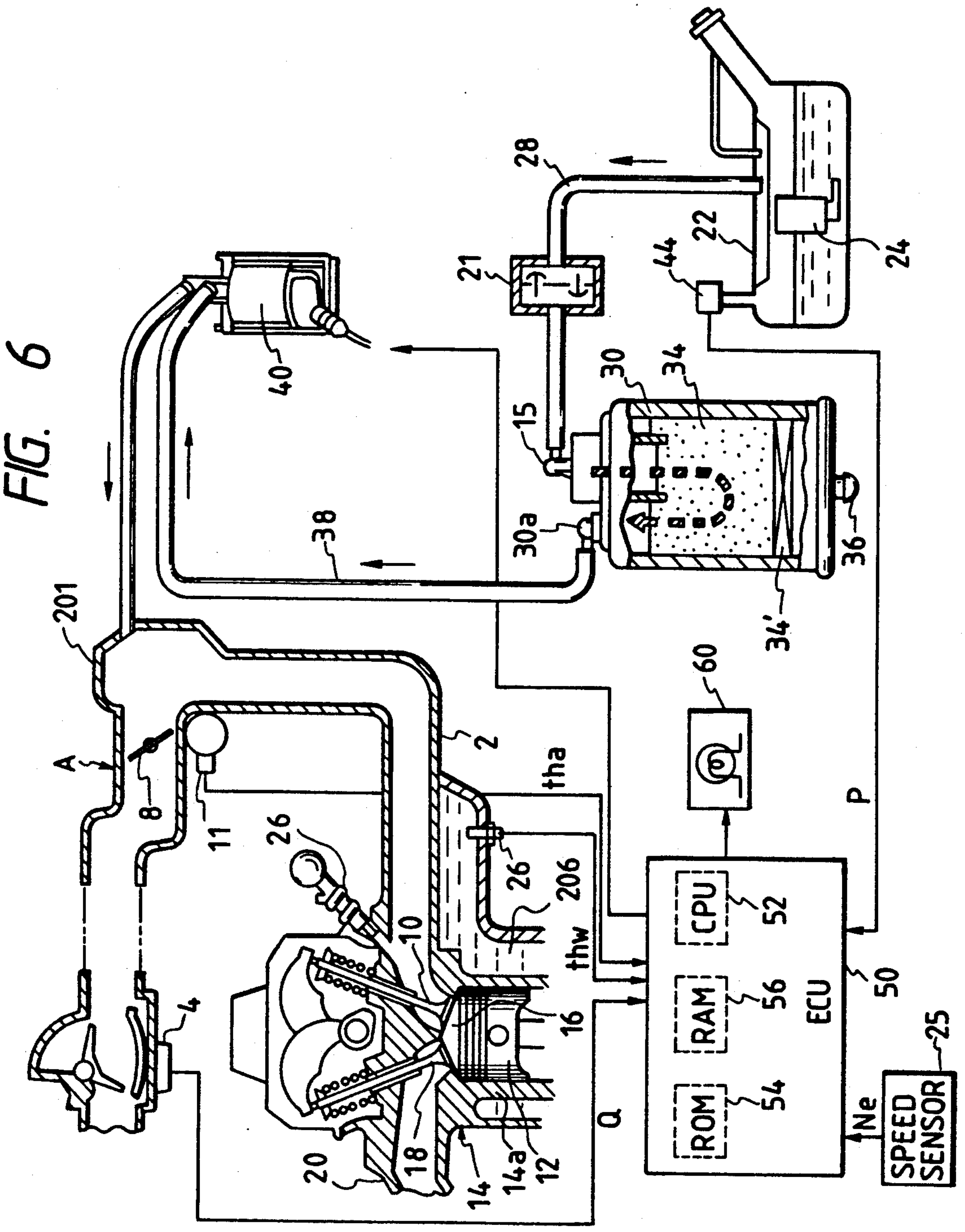
FIG. 6 shows an entire arrangement of an abnormality detecting apparatus for a fuel transpiration preventing system according to a third embodiment of this invention.

A description will be made hereinbelow with reference to FIG. 6 in terms of an abnormality detecting apparatus for a fuel transpiration prevention system according to a third embodiment of this invention. One feature of this third embodiment is that the abnormality decision is made on the basis of the deviation between the pressures within a fuel tank which are detected when a control valve, provided in a supply passage directed to an intake pipe of an internal combustion engine, takes the opening and closing states. FIG. 6 shows the entire arrangement of the abnormality detecting apparatus according to the third embodiment, where parts corresponding to those in FIG. 2 are marked with the same numerals and the description thereof omitted for brevity. In FIG. 6, illustrated at numeral 30 is a canister including an absorbing device 34 for absorbing the fuel gas generated from fuel within a fuel tank 22. The fuel tank 22 encases a fuel pump 24 for supplying the fuel through a fuel passage (not shown) to an injector 26 under pressure. The canister 30 has at its lower portion an atmosphere-communicating opening 36 so that air can be sucked through a filter 34' into the canister 30.

Further, the canister 30 has at its upper portion an inlet port 15 which is coupled through a communication pipe 28 to the fuel tank 22. In the communication pipe 28 there is provided a two-way valve 21 which is arranged so as to be opened when the pressure deviation between the flows in two directions increases. The canister 30 also has at its upper portion an outlet port 30*a* which is coupled through a supply passage 38 to a surge tank 201 provided within the intake pipe 2. In the supply passage 38 there is provided an electrically operable control valve 40 for opening and closing the supply passage 38 to allow and cut supply of fuel gas to the intake pipe 2. Accordingly, when the pressure within the fuel tank 22 increases because of the generation of the fuel gas from the fuel within the fuel tank 22, the two-way valve 21 takes the opening state so that the fuel gas within the fuel tank 22 is led into the canister 30 and then absorbed by the absorbing device 34. Further, when the control calve 40 enters into the opening state, the fuel gas is led from the canister 30 through the supply passage 38 into the intake pipe 2 due to the suction produced by the negative pressure generated within the intake pipe 2 and further introduced into a combustion chamber 16 formed by a cylinder 14*a* and a piston 12.

Moreover, illustrated at numeral 50 is an electronic control unit (ECU) which performs operations for the abnormality decision of the fuel gas supply system (which operations will hereinafter be described in detail) on the basis of the detection signals from various sensors such as an airflow meter 4, a throttle sensor 11, a pressure sensor 44, a water-temperature sensor 26 and a rotational speed sensor 25. The pressure sensor 44 is provided in relation to the fuel tank 22 in order to detect the pressure within the fuel tank 22, the rotational speed sensor 25 is provided in relation to a rotor in a distributer, rotatable in connection with the internal combustion engine, so as to detect the rotational speed of the engine, and the water-temperature sensor 26 measures the temperature of the cooling water passing through a cooling water path 206. Further, the airflow meter 4 is provided in the intake pipe 2 to detect the intake amount sucked in the intake pipe 2, and the throttle sensor 11 is for detecting the opening degree of the throttle valve 8.

Figure 7:
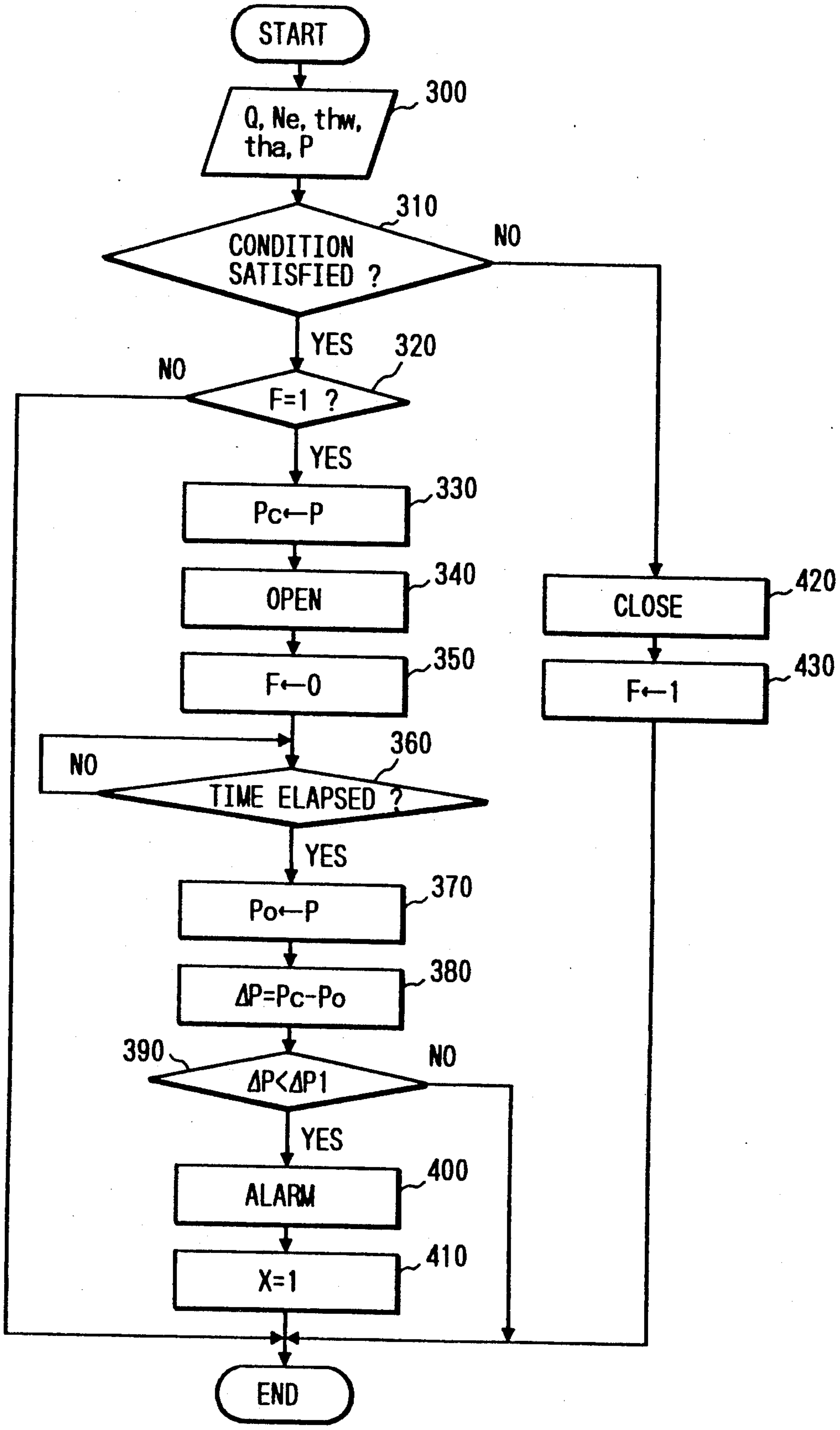
FIG. 7 is a flow chart for describing the abnormality detecting operation to be executed by the abnormality detecting apparatus according to the third embodiment.

An operation of the third embodiment of this invention to be executed by the ECU 50 will be described hereinbelow with reference to a flow chart of FIG. 7. This operation is executed at predetermined time intervals (for example, 60 ms). In FIG. 7, a step 300 is first executed in order to input the intake air amount Q, engine rotational speed Ne, cooling water temperature thw, throttle opening degree tha and the tank internal pressure P which are detected by the sensors 4, 25, 26, 11 and 44, respectively. A step 310 follows to check whether a purge condition is satisfied. Here, the purge condition means that, after the warming-up of the engine (the cooling water temperature thw is above a predetermined temperature, for example, 40° C.), the throttle valve 8 is in the opening state (the throttle opening degree tha is above a predetermined value T1, for example, 20%) and the engine load (Q/N) is above a predetermined value. If the purge condition is satisfied in the step 310, a step 320 follows to check whether a flag F indicative of the previous state of the solenoid valve 31 is set to "1". That is, the setting of the flag F to "1" means that, in cases where the control valve 40 is in the closing state up to the last time, the control valve 40 is switched from the closing state to the opening state at this time because of the satisfaction of the purge condition. A subsequent step 330 is then executed to store as a closing-state pressure Pc the tank internal pressure P immediately before the switching of the control valve 40 to the opening state, i.e., the tank internal pressure P obtained when the control valve 40 is in the closing state. The control advances from the step 330 to a step 340 so as to open the control valve 40 and further advances to a step 350 to reset the flag F to "0". Thereafter, a step 360 is executed in order to check whether a predetermined time period has elapsed, the predetermined time period being set to be a time period (delay time) from the switching of the control valve 40 from the closing state to the opening state up to the completion in variation of the tank internal pressure P due to this switching. If not elapsed, the control assumes the watch-and-wait attitude until the predetermined time period has elapsed. If elapsed, the control goes to a step 370 to store as an opening-state pressure Po the tank internal pressure P obtained when the control valve 40 takes the opening state, and then proceeds to a step 380 so as to calculate the deviation ΔP between the closing-state pressure Pc stored in the step 330 and the opening-state pressure Po stored in the step 370, and further advancing to a step 390 to compare the deviation ΔP with a predetermined value ΔP1. If the deviation ΔP is greater than the predetermined value ΔP1, this routine terminates. If being smaller than the predetermined value ΔP1, the ECU 50 decides an abnormality and then executes a step 400 to light an alarm lamp 60, further followed by a step 410 to set an abnormality decision flag X to "1", before terminating this routine.

Here, the predetermined value P1 is determined in advance in accordance with a test and set to be a value near the minimum value of the pressure variation range when the tank internal pressure is normal. Further, before and after the switching of the control valve 40, the tank internal pressure becomes low due to the negative pressure caused by the control valve 40 being in the opening state, and substantially becomes equal to the atmosphere pressure when the control valve 40 is in the closing state. Thus, the pressure deviation ΔP before and after the switching of the control valve 40 becomes greater than the predetermined value ΔP1 if normal. On the other hand, in case that the supply pipe 38 or the communication pipe 28 is collapsed or bent for some reason or clogged by some material, or in case that the control valve 40 is damaged so as to keep the closing state, the tank internal pressure P is maintained to be substantially equal to the atmosphere pressure and the pressure deviation ΔP is about 0 and does not vary. Similarly, in case that the supply passage 38 is disconnected from the canister 30 or disconnected from the control valve 40 or the intake pipe 2, or in case that the communication pipe 28 is disconnected from the canister 30 or the tank 22, the tank internal pressure P does not vary and the pressure deviation ΔP becomes substantially 0. Accordingly, when the pressure deviation ΔP is smaller than the predetermined value ΔP1, it is decided that an abnormality has occurred, thereby proceeding to the step 400 to light the alarm lamp 60. On the other hand, when the pressure deviation ΔP is greater than the predetermined value ΔP1, a normal state is concluded, thereby terminating this routine.

Returning back to step 310, if the purge condition is not satisfied, the operational flow goes to a step 420 to close the control valve 40, then followed by a step 430 to set the state decision flag F to "1", thereafter terminating this routine. Further, if the answer of the step 320 is negative, the abnormality decision processing is not performed in accordance with the determination that the switching of the control valve 40 from the closing state to the opening state is not required at this time.

Here, the contents of the abnormality decision flag X can be maintained even if the engine stops by being stored in a non-volatile RAM 56 so as to be freely rewritable, whereby, if once set, the abnormality decision flag X is not reset except when a predetermined processing is executed to repair damaged portion.

Further, a description will be made hereinbelow with reference to FIGS. 8A, 8B and 9 in terms of an abnormality detecting apparatus according to a fourth embodiment of this invention. One different of this embodiment in structure from the FIG. 6 embodiment is that a switching valve 32 is provided with respect to the atmosphere-communicating opening 36 so as to perform the opening and closing control of the atmosphere-communicating opening 36. This switching valve 32 is arranged to be electromagnetically controlled in accordance with a signal from the ECU 50. Further, the switching valve 32 normally takes the closing state, an opening state taken only when an abnormality decision is to be made when the control valve 40 switches from the closing state to the opening state.

Figure 8A:
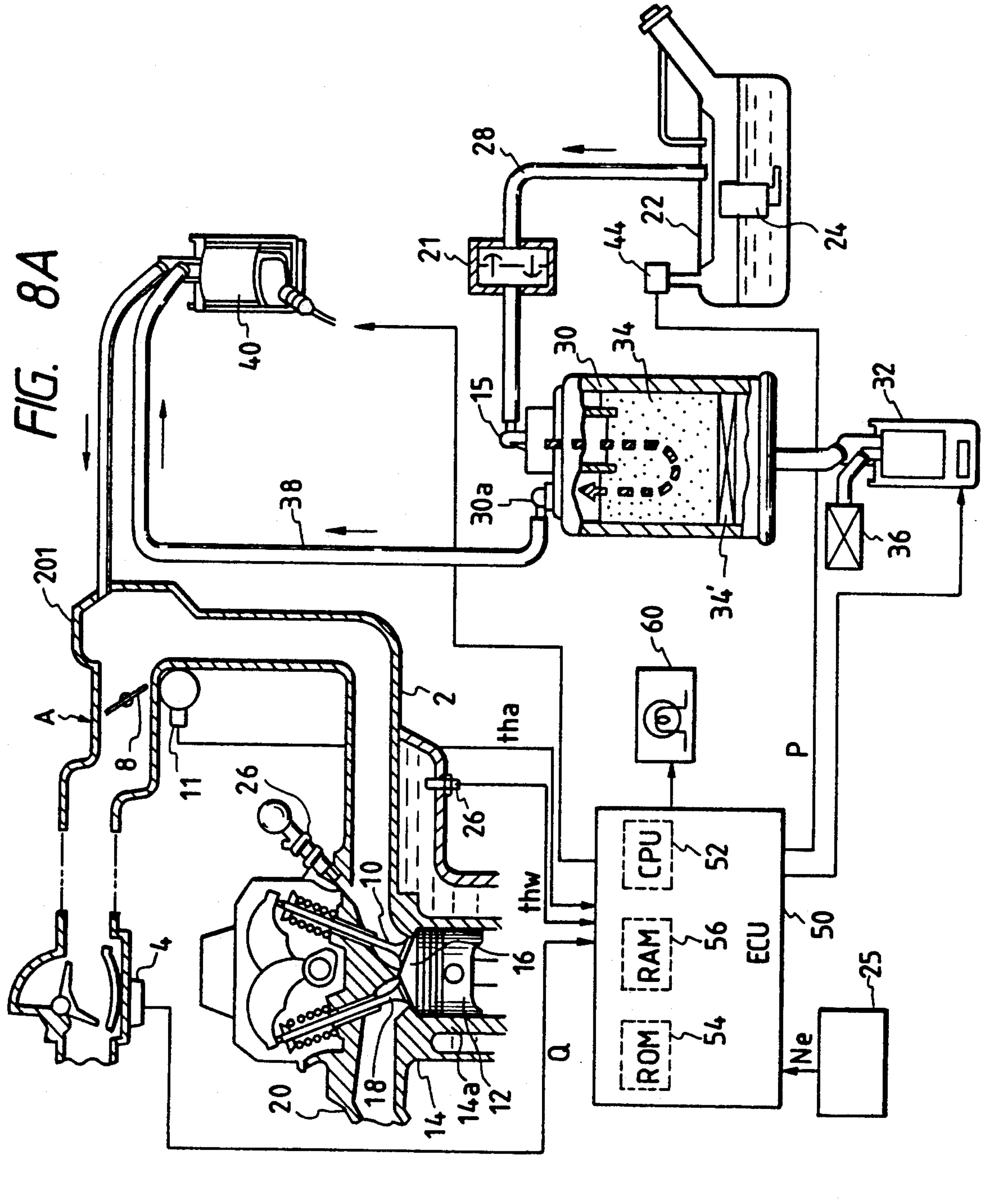
FIG. 8A shows an entire arrangement of an abnormality detecting apparatus for a fuel transpiration preventing system according to a fourth embodiment of this invention.
Figure 8B:
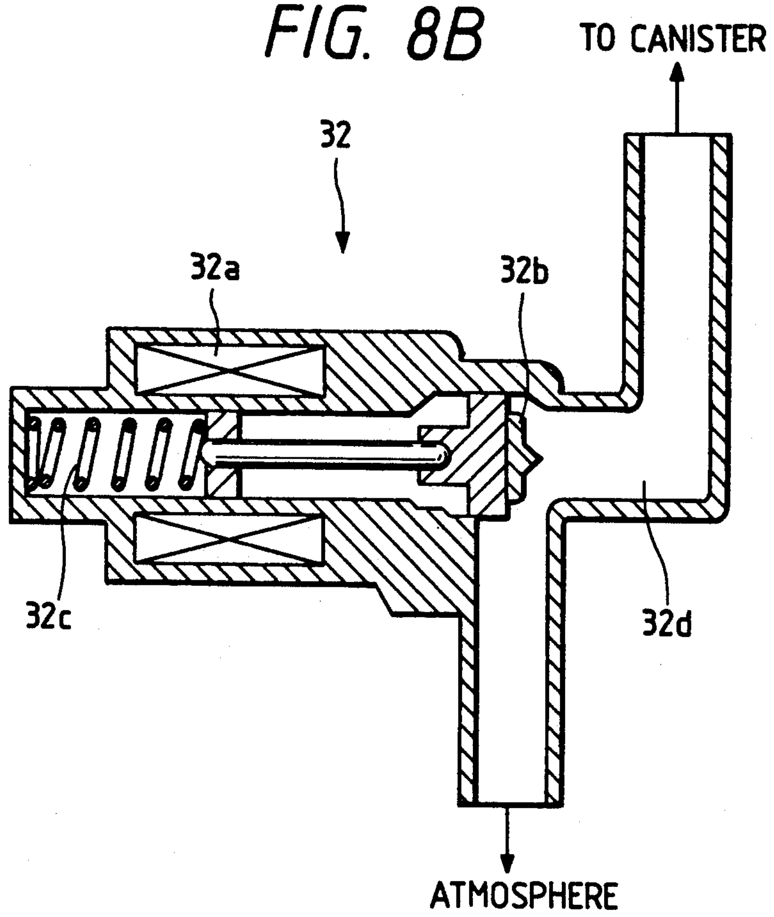
FIG. 8B a cross-sectional view showing one example of the arrangement of a switching valve for opening and closing an atmosphere-communicating opening of a canister in the fourth embodiment.

FIG. 8B is a cross-sectional view showing one example of the arrangement of the switching valve 32. In FIG. 8B, a predetermined voltage (for example, above 6 V) is not applied to a coil *32a*, a valve body *32b* opens a passage *32d* between the canister 30 and the atmosphere-communicating opening 36 by means of a biasing force of a spring *32c*. On the other hand, in response to applying the predetermined valve to the coil *32a*, the coil *32a* is energized so that the valve body *32b* is moved against the biasing force of the spring *32c* so as to close the passage *32d*.

Operation of the abnormality detecting apparatus according to the fourth embodiment will be described hereinbelow with reference to FIG. 9 where steps corresponding to those in FIG. 7 are marked with the same numerals and the description omitted for brevity. In FIG. 9, steps 300 to 360 are for switching the control valve 40 from the closing state to the opening state as described above. When a predetermined time period has elapsed after the control valve 40 is switched, a step 440 is executed to store as an opening-state pressure Poff the tank internal pressure P obtained when the control valve 40 is in the opening state and the switching valve 32 is in the opening state. Further, a step 450 is executed to close the switching valve 32, then followed by a step 460 to check whether a predetermined time period has elapsed after the switching valve 32 takes the closing state. Here, the predetermined time period is the time taken for the termination of variation of the tank internal pressure P due to the closing of the switching valve 32. In response to the elapse of the predetermined time, a step 470 follows to store as a closing-state pressure Pon the tank internal pressure P obtained when the control valve 40 is in the opening state and the switching valve 32 is in the closing state. In a subsequent step 480 a pressure deviation ΔPx is calculated on the basis of the pressures Poff and Pon, and in a step 490 the pressure deviation ΔPx is compared with a predetermined value X1. This predetermined value X1 is determined in advance accordance with a test, and set to the minimum value of the variation range of the tank internal pressure P obtained in response to the opening and closing operations of the switching valve 32 when the gas supply system is normal and the control valve 40 is in the opening state. When the control valve 40 is in the opening state and the switching valve 32 is the opening state, as in the case of being in the normal state, the pressure P becomes a value near the atmosphere pressure, and when the switching valve 32 enters into the closing state, the pressure P becomes the negative pressure within the intake pipe 2, i.e., becomes lower than the atmosphere pressure. Thus, the pressure deviation ΔPx becomes greater than the predetermined value X1 in the case of being in the normal state.

Accordingly, when in the step 490 the pressure deviation ΔPx is smaller than the predetermined value X1, the abnormality decision is made, thereby proceeding to steps 400 and 410 to light the alarm lamp 60 and set the abnormality decision flag X to "1". After the switching valve 32 is opened in the next step 500, this routine terminates.

According to this embodiment, in case that there are troubles such as a disconnection between the supply pipe 38 and the control valve 40 or the canister 30, disconnection between the communication pipe 28 and the canister 30 or the tank 22, or the clogging in the supply pipe 38 and the communication pipe 28, even if the switching valve 32 is switched to the closing state, the tank internal pressure P does not drop and produce the negative suction pressure, and hence the pressure deviation ΔPx becomes lower than the predetermined value X1, thereby deciding the abnormality.

Figure 10:
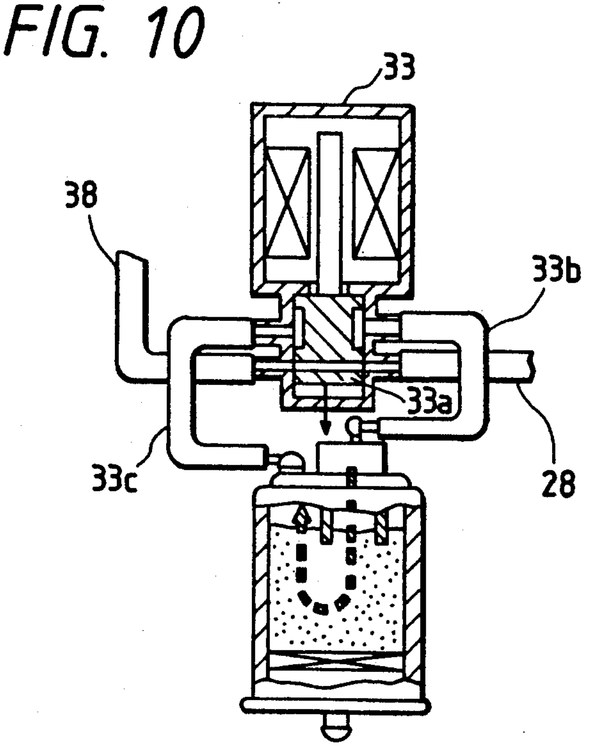
FIG. 10 shows an arrangement of a change-over valve to be used in an abnormality detecting apparatus according to a fifth embodiment of this invention.

A fifth embodiment will be described hereinbelow with reference to FIGS. 10 and 11. The fifth embodiment includes a change-over valve 33 as a bypass control means in place of the switching valve 32 illustrated in FIG. 8 so that the communication pipe 28 can be communicated directly with the supply pipe 38 to bypass the canister 30, or so that the communication pipe 28 is communicated through the canister 30 with the supply pipe 38. More specifically, the change-over valve 33 is constructed as illustrated in FIG. 10 and arranged to be driven in accordance with a signal from the ECU 50. In response to an opening signal from the ECU 50, a valve section 33*a* of the change-over valve 33 takes a position as illustrated in FIG. 10 so that the communication pipe 28 is directly communicated with the supply pipe 38 so as to by-pass the canister 30. On the other hand, in response to a closing signal from the ECU 50, the valve section 33*a* thereof is driven in a direction indicated by an arrow so that the communication valve 28 is coupled through an auxiliary pipe 33*b* to the canister 30 and further the supply pipe 38 is coupled through an auxiliary pipe 33*c* to the canister 30. That is, the communication pipe 28 and the supply pipe 38 are coupled to each other through the canister in response to the closing signal from the ECU 50.

Thus, in cases where the change-over valve 33 is driven with the control valve 40 being in the opening state, when the supply system is in the normal state and the change-over valve 33 takes the by-pass state in response to the opening signal from the ECU 50, the tank internal pressure is lowered so as to be substantially equal to the negative pressure within the intake pipe 2. When taking the non-by-pass state in response to the close signal therefrom, the tank internal pressure takes a value near the atmosphere pressure, thereby increasing the deviation therebetween. Accordingly, the normality decision can be made when the deviation is greater than a minimum amplitude value X2 (obtained in advance through a test or the like) of the pressure when the control valve 40 is in the opening state and the change-over valve 33 is driven. The ECU 50 normally generates the close signal and open signal when making the abnormality decision.

Figure 9:
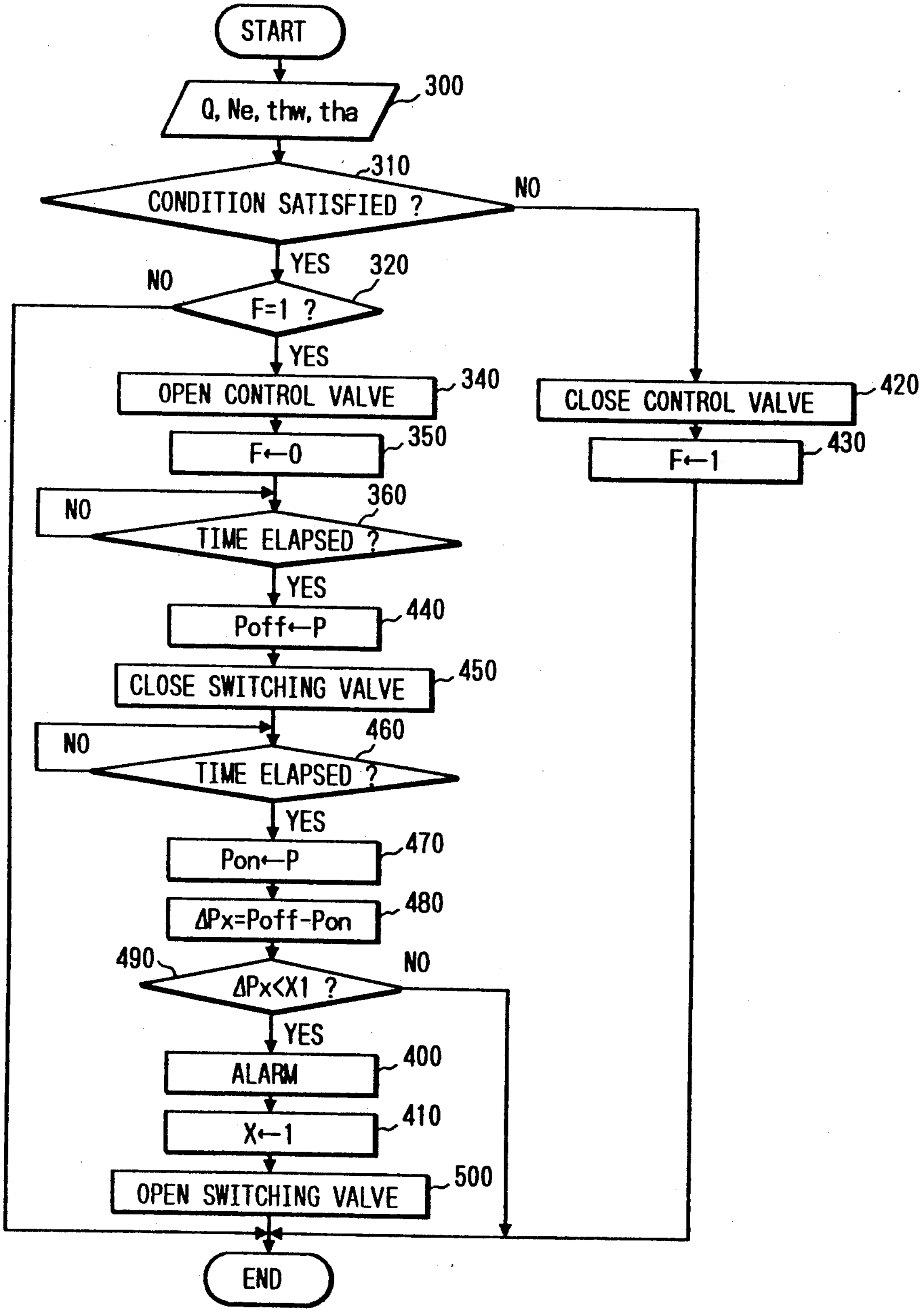
FIG. 9 is a flow chart for describing the abnormality detecting operation to be executed by the abnormality detecting apparatus according to the fourth embodiment.
Figure 11:
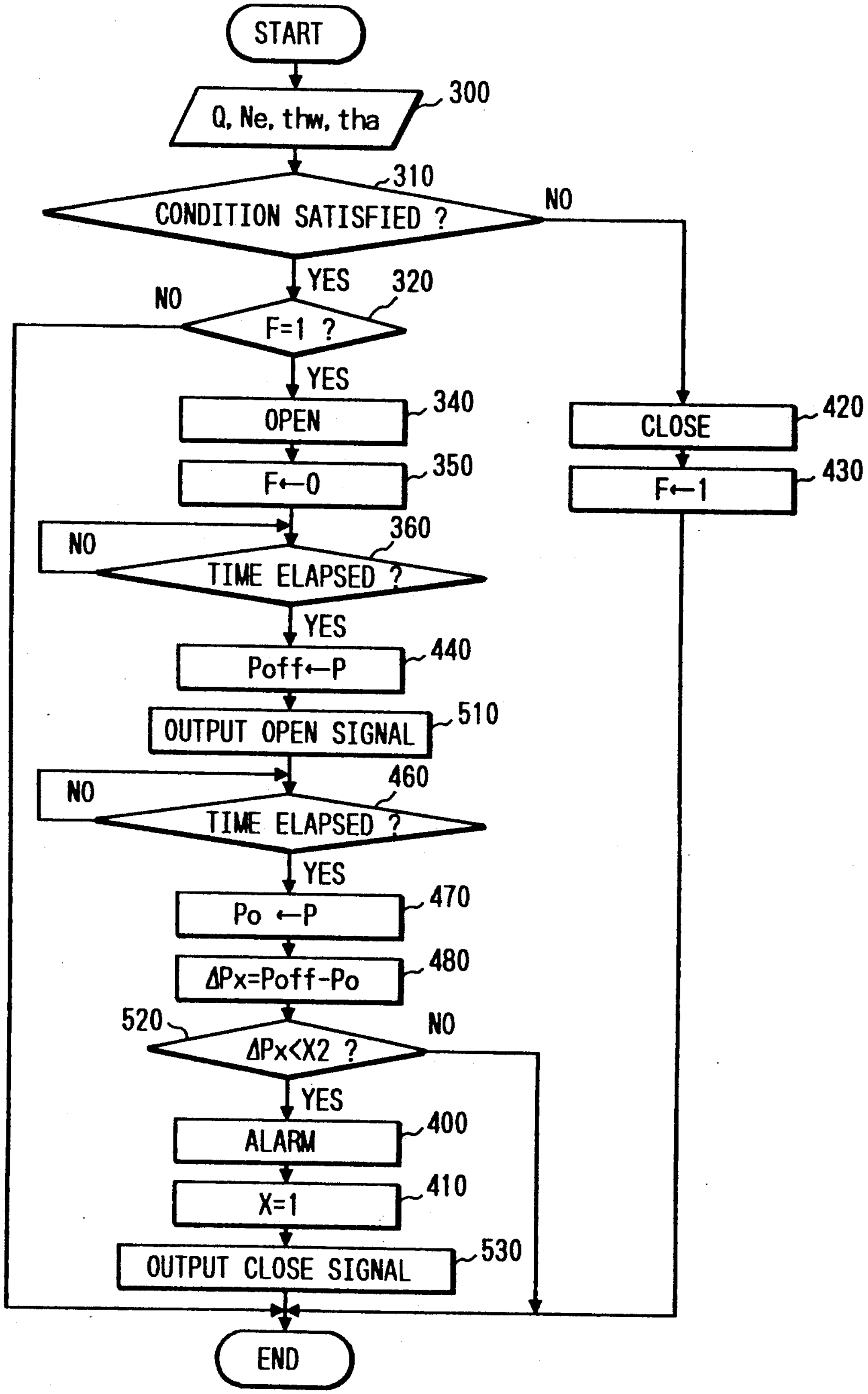
FIG. 11 is a flow chart for describing the fifth embodiment of this invention.

FIG. 11 is a flow chart for describing the operation of the fifth embodiment, where steps corresponding to those in FIG. 9 are marked with the same numerals and steps 510, 520 and 530 are provided in place of the steps 450, 490 and 500 in FIG. 9. In step 510 the ECU 50 outputs the open signal to the change-over valve 33 to by-pass the canister 30 and establish direct communication between the communication pipe 28 and the supply pipe 38. Thereafter, in the steps 460 and 470 the pressure P is detected in the case where the change-over valve 33 takes the bypass state and the predetermined time period has elapsed, then obtaining the deviation in pressure between the non-bypass state and the bypass state in the step 480, it is determined whether the deviation is smaller than the minimum amplitude value X2 in the step 520. When smaller than the minimum amplitude value X2, the abnormality decision is made to light the alarm lamp in 400 and set the flag X to "1", before outputting the close signal to the change-over valve 33 in the step 530 and terminating this routine.

Although in the above-described third to fifth embodiments the supply pipe 38 is opened and closed through the control valve 40 to establish or cut the supply of the fuel gas to the intake pipe 2, if the supply pipe 38 is connected to the intake pipe 2 at the vicinity of the throttle valve 8, for example, at a portion indicated by character A in FIG. 6, it is also possible to use the opening and closing function of the throttle valve 8 in place of the control valve 40. That is, when the throttle valve 8 is in the closing state, the pressure within the supply pipe 38 becomes equal to the atmosphere pressure so that the fuel gas is not introduced into the intake pipe 2. In other words, the supply pipe 38 results in the closed state. On the other hand, when the throttle valve 8 is in the opening state, the pressure within the supply pipe 38 becomes a negative pressure so that the fuel gas is introduced into the intake pipe 2. In other words, the supply pipe 38 results in the opened state. Accordingly, if a deviation between the tank internal pressures is obtained when the throttle valve 8 is in the opening state and the closing state, it is possible to perform the abnormality decision as well as the above-described embodiments. At this time, an idle switch can also be used as an opening and closing detecting means of the throttle valve opening degree.

Figure 12:
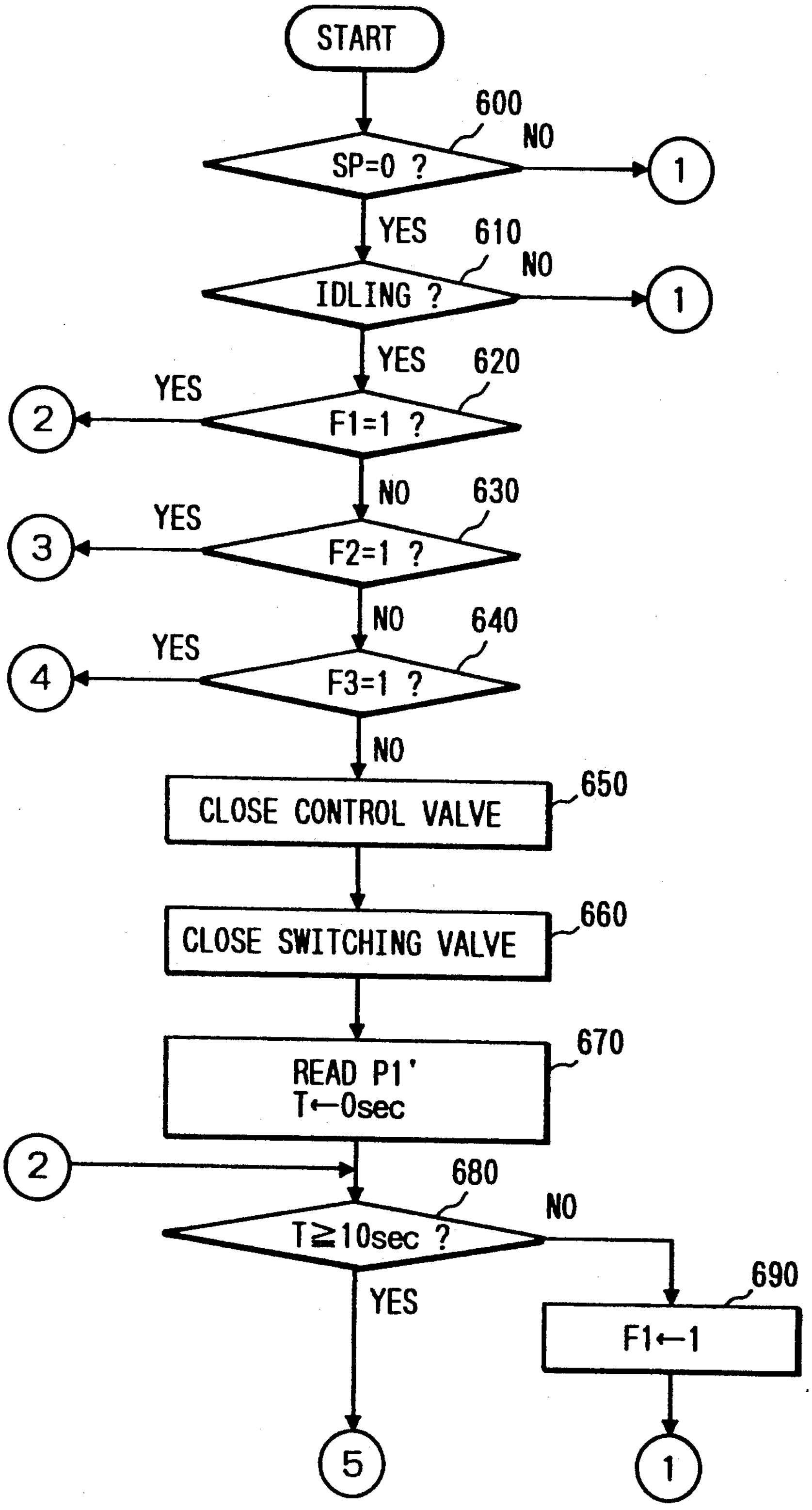
FIGS. 12 and 13 are flow charts for describing an operation of an abnormality detecting apparatus according to a sixth embodiment of this invention.
Figure 13:
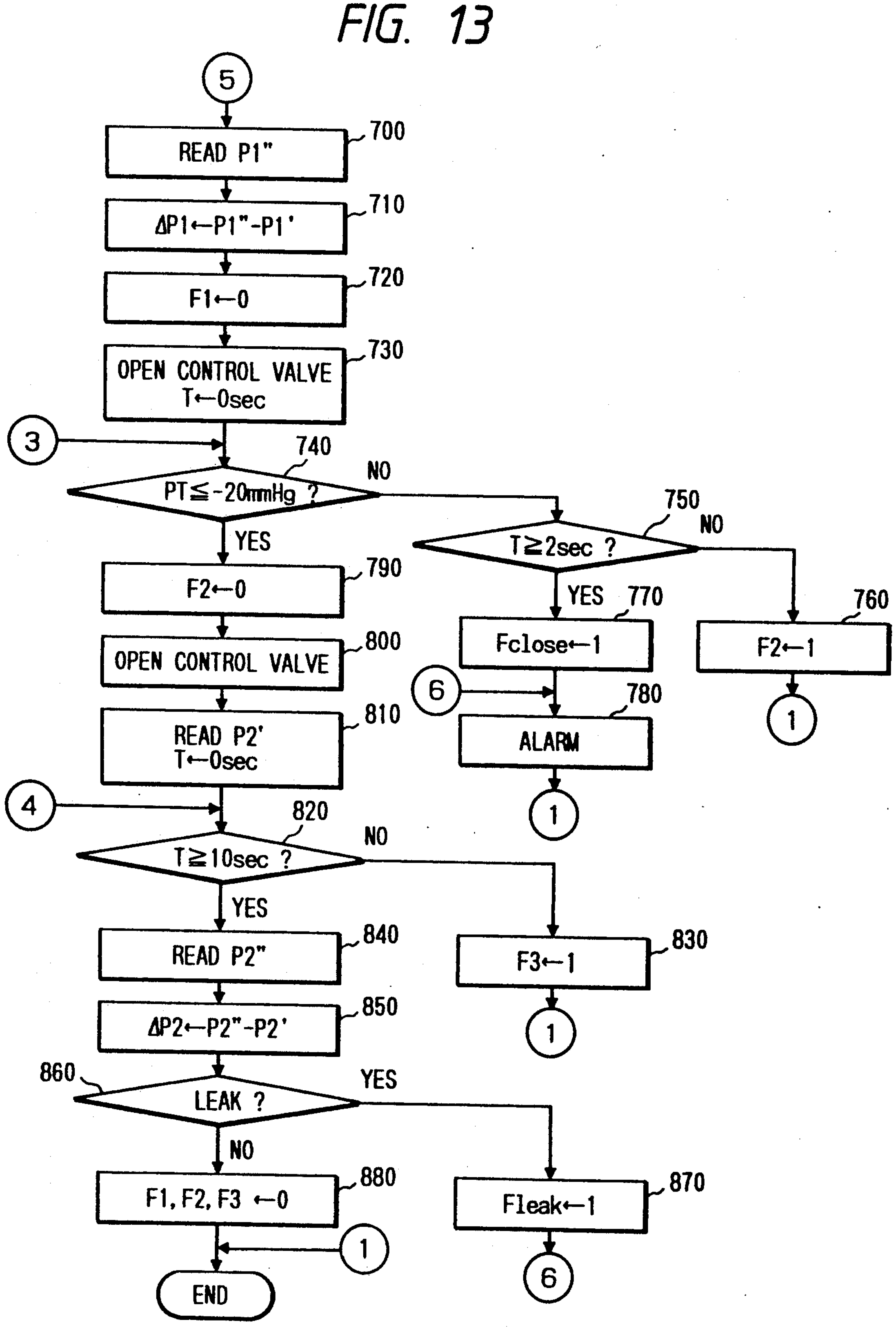

In addition a description will be made hereinbelow with reference to FIGS. 12 and 13 in terms of an operation of an abnormality detecting apparatus according to a sixth embodiment of this invention. The abnormality detecting control, together with the fuel injection control and the like, will repeatedly be executed at predetermined time intervals (for example, 256 ms) in response to the turning-on of the key switch. The mechanical arrangement of the sixth embodiment can be made to be substantially similar to that as illustrated in FIG. 8A (or 1A). In FIGS. 12 and 13, the control operation starts with a step 600 to check whether a vehicle speed SP is zero. This vehicle speed is a speed of a motor vehicle on which the internal combustion engine is mounted, and is detected by a well-known vehicle speed sensor. If the answer of the step 600 is "NO", this routine terminates. If the answer of the step 600 is "YES", a step 610 follows to check whether the motor vehicle is on an idling operation. The idling operation of the motor vehicle can be sensed by a well-known idle switch. If the decision of the step 610 is negative, this routine similarly terminates. That is, the abnormality decision is made only when the motor vehicle is stopped and the internal combustion engine is in an idling operation because, when the motor vehicle is running on an irregular road surface or is turning, the tank internal pressure varies, thereby making it difficult to accurately perform the abnormality decision. Additionally, when the internal combustion engine is in a racing state, even if the motor vehicle stopped, the engine rotational speed is unstable, whereby the tank internal pressure becomes unstable so as to make it difficult to accurately perform the abnormality decision.

Figure 14:
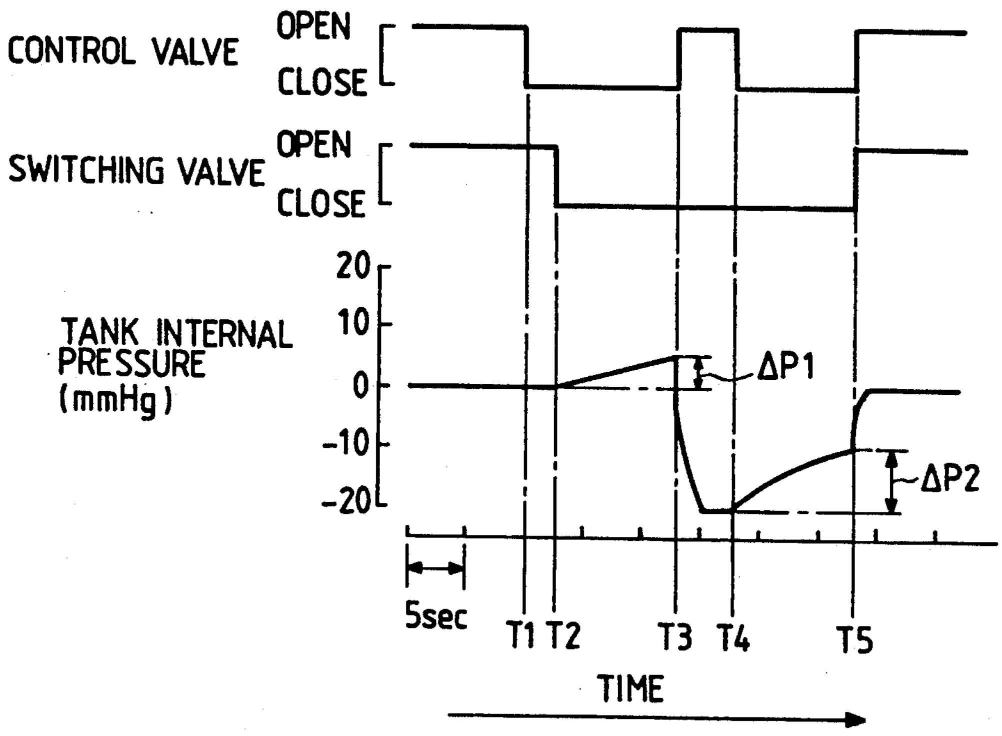
FIG. 14 is a graphic illustration useful for a better understanding of the sixth embodiment of this invention.

On the other hand, if the decision of the step 610 is affirmative, steps 620 to 640 are executed in order to check whether first to third flags F1 to F3 are respectively set to "1". That is, these steps 620 to 640 are for dividing the control into four operation stages to be taken in accordance with the setting states of the flags F1 to F3. If all the flags F1 to F3 take "0", i.e., when all the answers of the steps 620 to 640 are negative, the control advances to a step 650 to execute the first stage operation. The step 650 is executed to fully close the control valve 40, then followed by a step 660 to fully close the switching valve 32, whereby the portion (fuel gas supply system) between the intake pipe 2 (control valve 40) and the fuel tank 22 is hermetically sealed. That is, as illustrated in FIG. 14, when the control valve 40 is fully closed at the time T1, the pressure of the portion between the control valve 40 and the fuel tank 22 becomes substantially equal to the atmosphere pressure through the atmosphere-communicating opening 36. When the switching valve 32 is then controlled to be fully closed at the time T2, the pressure of the portion therebetween can be kept as it is.

A subsequent step 670 is provided in order to read the output signal of the pressure sensor 44 immediately after the sealing so as to store the pressure value as a tank internal pressure P1′, and further to reset and start a timer T provided in the ECU 50. In the next step 680 it is checked whether a predetermined time period (10 seconds) is elapsed from the execution of the step 670. If not yet elapsed, the control goes to a step 690 to set the first flag F1 to "1", thereby advancing to the second operation stage. In the second operation stage, the answer of the step 620 is "YES" and the control directly proceeds to the step 680. The ECU 50 repeatedly performs the operations of the steps 600, 610, 620, 680 and 690. During this time (time interval between the times T2 and T3 in FIG. 14), the tank internal pressure increases from 0 mmHg in accordance with the generation amount of the fuel gas within the fuel tank 22.

In response to the elapse of 10 seconds, the ECU 50 immediately reads the output signal of the pressure sensor 44 to store the pressure value as a tank internal pressure P1″ in a step 700 and then calculates the pressure variation (variation under the atmosphere pressure) ΔP1 of the 10-second duration after the sealing between the control valve 40 and the fuel tank 22 in step 710 and further resets the first flag F1 to "0" in step 720, thereby terminating the second operation stage and entering into the third operation stage.

In the third operation stage, at step 730, the ECU 50 first switches the control valve 40 from the fully closed state to the fully opened state and, at the same time, resets and starts the timer T. Because of fully opening the control valve 40, the suction negative pressure within the intake pipe 2 is introduced into the portion between the control valve 40 and the fuel tank 22 (at the time T3 in FIG. 14), whereby the detection value of the pressure sensor 44 starts to decrease if there is no abnormality such as clogging in the fuel gas supply system. A step 740 follows to check, on the basis of the output signal of the pressure sensor 44, whether the tank internal pressure PT becomes below −20 mmHg. If the decision of the step 740 is "NO", the control goes to a step 750 to check whether a predetermined time period (2 seconds) has elapsed from the execution of the step 730. If not elapsed, a step 760 is executed so as to set the second flag F2 to "1", whereby the decision of the step 620 becomes negative and the decision of the step 630 become affirmative so as to repeatedly perform the operations of the steps 600 to 630, 740 and 750 for taking the watch-and-wait attitude until the decision of the step 750 becomes "YES". In the case that the decision of the step 750 first becomes "YES", in a step 770 the ECU 50 sets a flag Fclose to "1" which is indicative of the fact that a clogging portion is at some point of the supply system from the fuel tank 22 to the intake pipe 2, thereby advancing to a step 780 to light the alarm lamp 60. On the other hand, in the case that the decision of the step 740 first becomes "YES", a step 790 follows to reset the second flag F2 to "0", then followed by a step 800 to again fully close the control valve 40 so as to seal the portion between the fuel tank 22 and the control valve 40 to keep the negative-pressure-applied state as it is, and further followed by a step 810 to read the output signal of the pressure sensor 44 so as to store the tank internal pressure P2′ immediately after the sealing of the portion therebetween and, at the same time, to reset and start the timer T, thereby shifting the control from the third operation stage to the fourth operation stage.

As obvious from the detection value of the pressure sensor 44 in FIG. 14, with the executions of the steps 790 to 810, the pressure of the sealed portion takes a state adjusted to the negative pressure of −20 mmHg at the time T4. Thus, the detection value of the pressure sensor 44 increases from −20 mmHg in accordance with the fuel gas generated within the fuel tank 22 for the time interval from the time T4 to the time T5.

A subsequent step 820 is provided in order to check whether a predetermined time period (10 seconds) is elapsed from the execution of the step 810. If not elapsed, the control goes to a step 830 to set the third flag F3 to "1", whereby the answers of the steps 620 and 630 are negative and the answer of the step 640 is affirmative so as to repeatedly perform the steps 600 to 640 and 820 for taking the watch-and-wait state. On the other hand, if elapsed, the control advances to a step 840 to read the output signal of the pressure sensor 44 so as to store the pressure value as a tank internal pressure P2″ (at the time T6 in FIG. 14) and further advances to a step 850 to calculate the pressure variation (variation under the negative pressure) ΔP2 for the 10-second duration after the sealing. Thereafter, in a step 860 the decision as to whether a leakage has occurred in the supply system is made on the basis of the following leakage decision condition (equation). That is, when the following condition is satisfied, the ECU 50 determines the occurrence of the leakage.

$$\Delta P2 > \alpha \bullet \Delta P1 + \beta$$

where $\alpha$ is a coefficient for correcting the difference in the fuel evaporation amount between the negative pressure and the atmosphere, and $\beta$ is a coefficient for correcting the pressure sensor 44 accuracy.

More specifically, if a leakage of the pressure occurs due to the sealed portion between the fuel tank 22 and the control valve 40, the discharge occurs from the sealed portion to the atmosphere under positive pressure and the introduction occurs from the atmosphere into the sealed portion under negative pressure. Accordingly, the variation ΔP1 (=the generation amount of the fuel gas within the fuel tank 22−the discharge amount from the sealed portion to the atmosphere) becomes greater than the variation ΔP2 (=the generation amount of the fuel gas within the fuel tank 22+the introduction amount from the atmosphere into the sealed portion). The above-mentioned decision condition is obtained from this fact.

If the above-mentioned condition, is satisfied i.e., when the decision of the step 860 is "YES", the control goes to a step 870 to set a leakage flag Fleak to "1" which is indicative of the fact that a leakage occurs at some point of the supply system between the fuel tank 22 and the intake pipe 2, thus advancing to the step 780 to light the alarm lamp 60. On the other hand, if the decision of the step 860 is "NO", the control goes to a step 880 to compulsorily reset the first to third flags F1 to F3, thereafter terminating this routine.

As described above, according to this embodiment, in case that a leakage or clogging occurs at a portion between the fuel tank 22 and the control valve 40, it is possible to always and surely detect the leakage or the closing irrespective of the attaching position of the pressure sensor 44. In addition, since the abnormality detecting operation is executed when the motor vehicle is stopped and in an idling state, it is possible to avoid decisional errors. Moreover, since the pressure sensor 44 can be arranged to sense a pressure within an operating range of the relief valve 22*a* of the fuel tank 22, the pressure sensor 44 is not required to be arranged to bear the large pressure fluctuations occurring when it is provided at a portion between the canister 30 and the intake pipe 2. As a result, it is possible to use a high-sensitivity sensor as the pressure sensor 44, thereby improving the abnormality detection accuracy.

Here, the kinds of detected abnormalities to be effected according to this embodiment are as follows.

1) Damage and Disconnection of Communication Pipe 28 or Supply Pipe 38

Since the atmosphere is introduced from the damaged or disconnected portion under the negative pressure and the discharge to the atmosphere occurs under the positive pressure, the answer of the step 860 becomes "YES", thereby detecting the abnormality.

2) Bending and Collapsing of Communication Pipe 28 or Supply Pipe 38

When the negative pressure is introduced into the supply system, the pressure does not decreases or the time necessary for decrease in the pressure is long, the answer of the step 740 becomes "NO" and the answer of the step 750 becomes "YES", it is possible to detect the abnormality.

3) Impossibility of Opening Control Valve 40

Since it is impossible to introduce the negative pressure into the supply system, the answer of the step 740 becomes "NO" and the answer of the step 750 becomes "YES", thereby detecting the abnormality and giving the abnormality information. This impossibility of the opening of the control valve 40 makes it difficult to introduce the fuel gas absorbed by the absorbing device 34 into the intake pipe 2, whereby the fuel gas is discharged from the atmosphere-communicating opening 36 of the canister 30 because the absorbing ability of the absorbing device 34 exceeded.

4) Disconnection of Supply Pipe 42

Since the introduction of the negative pressure from the intake pipe 2 becomes impossible, as in cases 2) and 3), the answer of the step 740 becomes "NO" and the answer of the step 750 becomes "YES", thereby giving abnormality information through the alarm lamp 60.

5) Bending and Collapsing of Supply Pipe 42

As well as in cases 2) and 3), the answer of the step 740 becomes "NO" and the answer of the step 750 becomes "YES" in the introduction of negative pressure. In this case, there is the possibility that the fuel gas is discharged through the atmosphere-communicating opening 36.

6) Clogging of Atmosphere-Communicating Opening 36 of Canister 30

This case does not cause the pressure to immediately and greatly increase, unlike the bending or collapsing of the pipes. This is because, although in the case of collapsing or the like of the supply pipes 38 and 42, the supply of the fuel gas cannot be achieved irrespective of the opening of the control valve 40, the fuel gas can be supplied irrespective of the clogging of the atmosphere-communicating opening 36 of the canister 30 when the control valve 40 takes the opening state. Accordingly, this embodiment is not arranged so as to immediately detect this abnormality, which does result in a great problem. However, if required, in the step 840 the canister switching valve 32 is opened immediately after the reading of the tank internal pressure P2″, whereby the decision of the clogging abnormality of the opening 36 can be made when the pressure within the supply system does not quickly approach the atmosphere pressure.

In the above-described cases 1) to 6), the decision of the abnormality is made on the basis of the pressure variation state after the pressure within the sealed portion is adjusted to a predetermined pressure or when adjusted to the predetermined pressure.

7) Impossibility of Closing of Control Valve 40

This abnormality causes the fuel gas to be introduced into the intake pipe 2. Unlike the impossibility of opening, the fuel gas is not discharged through the atmosphere-communicating opening 36 of the canister 30. Accordingly, this embodiment is not arranged to detect this abnormality. However, if required, it is possible to decide the impossibility of the closing of the control valve 40 when the pressure variation ΔP1 obtained in the step 710 becomes below a predetermined negative pressure.

8) Damage such as crack of Supply Pipe 42

Since the supply pipe 42 is a portion through which the fuel gas passes only when the control valve 40 takes the opening state, as well as the abnormality of the opening 36 of the canister 30, this case does not provide a great problem. Accordingly, this embodiment is not arranged to detect the abnormality in terms of the damages of the supply pipe 42.

Figure 15:
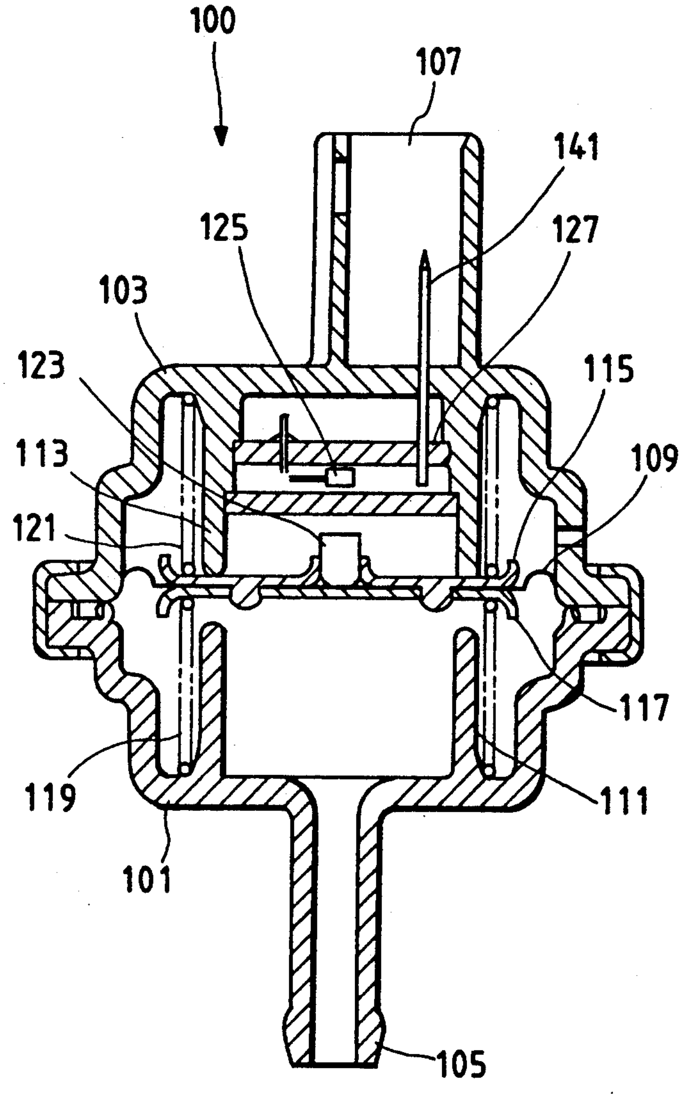
FIG. 15 is a cross-sectional view showing an arrangement of a pressure sensor to be used in an abnormality detecting apparatus according to a seventh embodiment of this invention.

Moreover, a description will be made hereinbelow with reference to FIGS. 15 to 19 in terms of a seventh embodiment of this invention. FIG. 15 shows an arrangement of a pressure sensor to be used as the sensor 44 in an abnormality detecting apparatus according to the seventh embodiment. The pressure sensor, designated at numeral 100, comprises a cup portion 101 having a cavity and a cap portion 103 similarly having a cavity, the cup portion 101 and cap portion 103 being coupled and engaged with each other so as to form a space therebetween. To the cup portion 101 there is connected one end of a pressure introduction pipe 105, the other end of which is in turn coupled to the inside of the fuel tank 22. To the cap portion 103 there is connected an electric-wire guiding pipe 105 for coupling a pressure-measuring electric wire to the pressure sensor 100. Between the cup portion 101 and the cap portion 103 there is provided a diaphragm 109 which divides the space into a cup-side space and a cap-side space. In the cup-side space and the cap-side space there are provided stoppers 111 and 113 which respectively extend from the inner walls of the cup portion 101 and the cap portion 103 toward the diaphragm 190, thereby restricting the movement range of the diaphragm 109. The diaphragm 109 is constructed with a fluorine-contained rubber (FKM) being reinforced by a foundation so as to have a thickness of 150 $\mu$ to 250 $\mu$. To both surfaces of the diaphragm 109 there are secured pressure-receiving plates 115 and 117. These pressure-receiving plates 115 and 117 are respectively biased from lower and upper sides by springs 119 and 121 so that the diaphragm 109 is movable between the stoppers 111 and 113 in accordance with the movement of the springs 119 and 121. That is, in the positional range between the stoppers 111 and 113, the diaphragm 109 stands at a position corresponding to the degree of the pressure (the tank internal pressure) introduced through the pressure-introducing pipe 105 into the cup-side space within the cup portion 101. At the central portion of the pressure-receiving plate 115 provided at the electric-wire guiding pipe 107 side there is fixedly disposed a rare magnet 123, and at a position facing the rare magnet 123 there is disposed a hybrid IC 127 including a Hall element 125, whereby it is possible to detect the displacement of the diaphragm 109, i.e., the pressure within the fuel tank 22, on the basis of the output of the Hall element 125.

Figure 16:
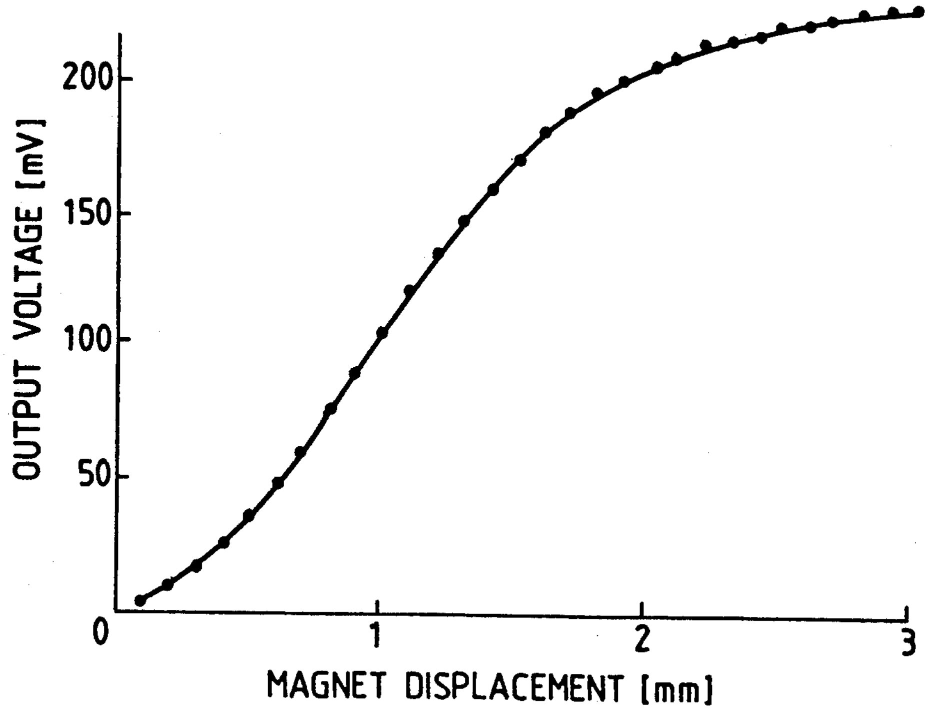
FIG. 16 is a graphic diagram showing the relation between the output voltage of a Hall element and a magnet in the seventh embodiment.
Figure 17:
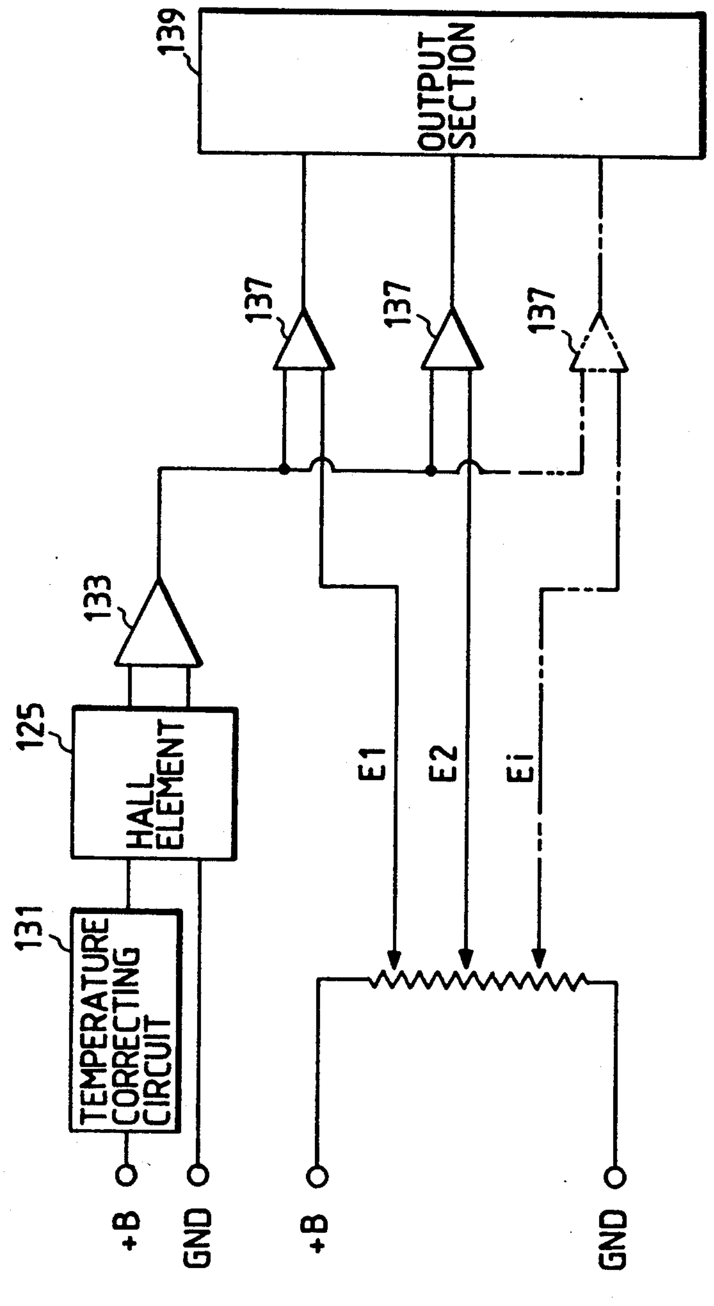
FIG. 17 shows a circuit arrangement of a hybrid IC used in the pressure sensor in the seventh embodiment.

In the pressure sensor 100 the diaphragm 109 moves upwardly or downwardly in response to the variation of the pressure within the fuel tank 22. Accordingly, the distance between the Hall element 125 and the rare magnet 123 varies in proportion to the variation of the pressure within the fuel tank 22 so as to change the magnetic flux to be introduced from the rare magnet 123 into the Hall element 125. As a result, the Hall element 125 outputs a voltage signal corresponding to the variation of the magnetic flux, i.e., the variation of the distance between the rare magnet 123 and the Hall element 125. FIG. 16 shows the relation between the output voltage of the Hall element 125 and the displacement of the rare magnet 123. Here, although the Hall element 125 itself is arranged to have a linearity of 2%, as shown in FIG. 16 the magnet displacement does not take a linear relation to the Hall element output. In addition, although the output voltage of the Hall element 125 itself is about 100 mV, since the ECU 50 is disposed away from the fuel tank 22, the output voltage of the Hall element 125 is required to be amplified. If not amplified, difficulty can be encountered in accurately deciding the output voltage of the Hall element 125. Thus, according to this embodiment, into the hybrid IC 127 there are incorporated an amplifying circuit and a linearity approximating circuit as shown in FIG. 17. In the amplifying circuit, a temperature correcting circuit 131 is coupled to the battery input terminal of the Hall element 125 and an amplifier 133 is coupled to the output terminal of the Hall element 125. Further, in the linearity approximating circuit, there are provided a plurality of comparators 137 which are disposed in parallel to each other and which are respectively responsive through their one input terminals to the output signal of the amplifier 133 and further responsive through their other input terminals to reference voltages E1 to Ei. The respective comparators 137 supply their output signals to an output section 139. The output section 139 is coupled through the electric wire to the ECU 50 so that the output signal of the Hall element 125 is amplified and linearly-approximated and then supplied to the ECU 50.

Figure 18:
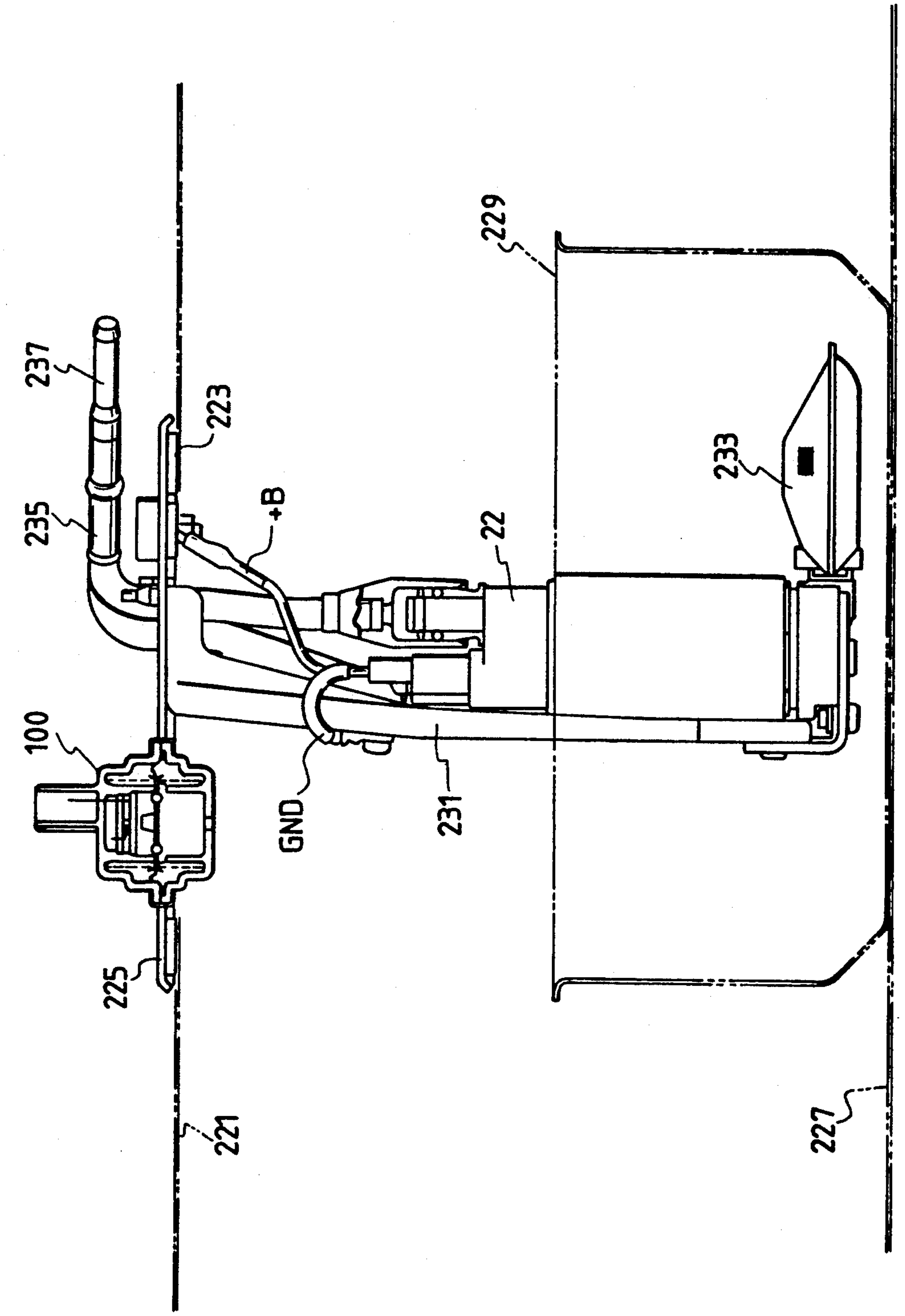
FIGS. 18 and 19 are illustrations for making the description in terms of attachment positions of the pressure sensor in the seventh embodiment.

As shown in FIG. 18, this pressure sensor 100 is disposed so as to penetrate a pump flange 225 fixed through gaskets 223 to an upper plate 221 of the fuel tank 22. The battery line +B and ground line GND of this pressure sensor 100 are used in common for the fuel pump 24 within the fuel tank 22. The fuel pump 24 is hung down through a pump bracket 231 so as to be positioned within a subtank 229 fixedly secured to a lower plate 227 of the fuel tank 22, and arranged to discharge the fuel, sucked through a fuel filter 223, from a discharge pipe 235.

Figure 19:
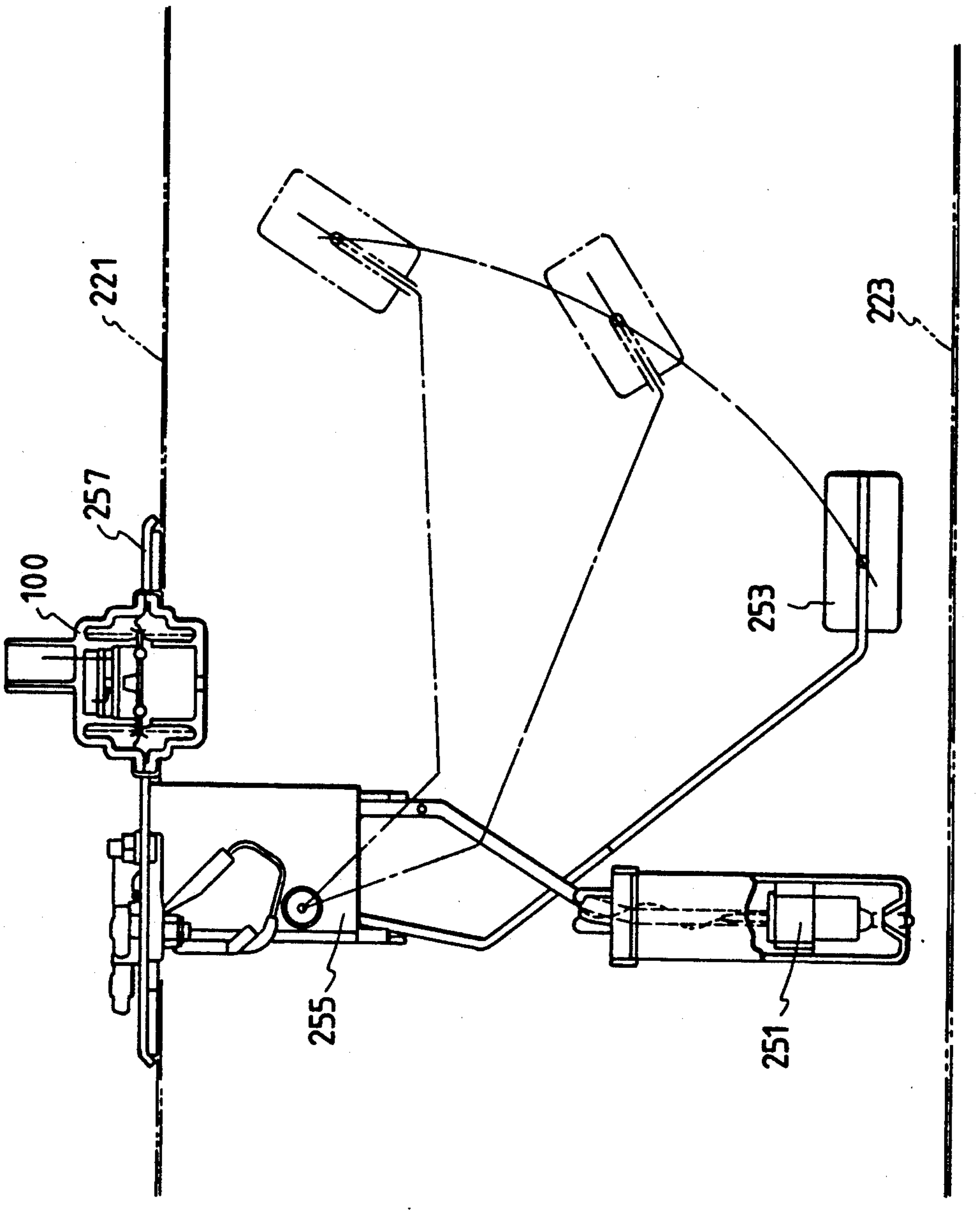

Further, the pressure sensor 100 can also be attached to the fuel tank 22 as illustrated in FIG. 19. That is, the pressure sensor 100 can be disposed to penetrate a sender flange 257 to which a remaining-amount alarm lamp 251 and a fuel sender 255 equipped with a float 253 are attached. It is also appropriate that the pressure sensor 100 is disposed in relation to a passage between the fuel tank 22 and the canister 30.

Since the pressure sensor 100 is arranged as described above, it is possible to more accurately detect the pressure within the fuel tank 22 as compared with a semiconductor pressure sensor even if it is disposed at a position that is easily exposed to moisture, gum material and the like generated from the fuel tank 22. In addition, unlike the semiconductor pressure sensor, the diaphragm 109 is not required to be constructed to have an extremely thin thickness, and hence it is possible to prevent the diaphragm from being damaged due to icing. Accordingly, it is possible to perform the pressure detection with a high reliability for a long time, thereby accurately performing the abnormality detection of the fuel transpiration preventing system.

Figure 20:
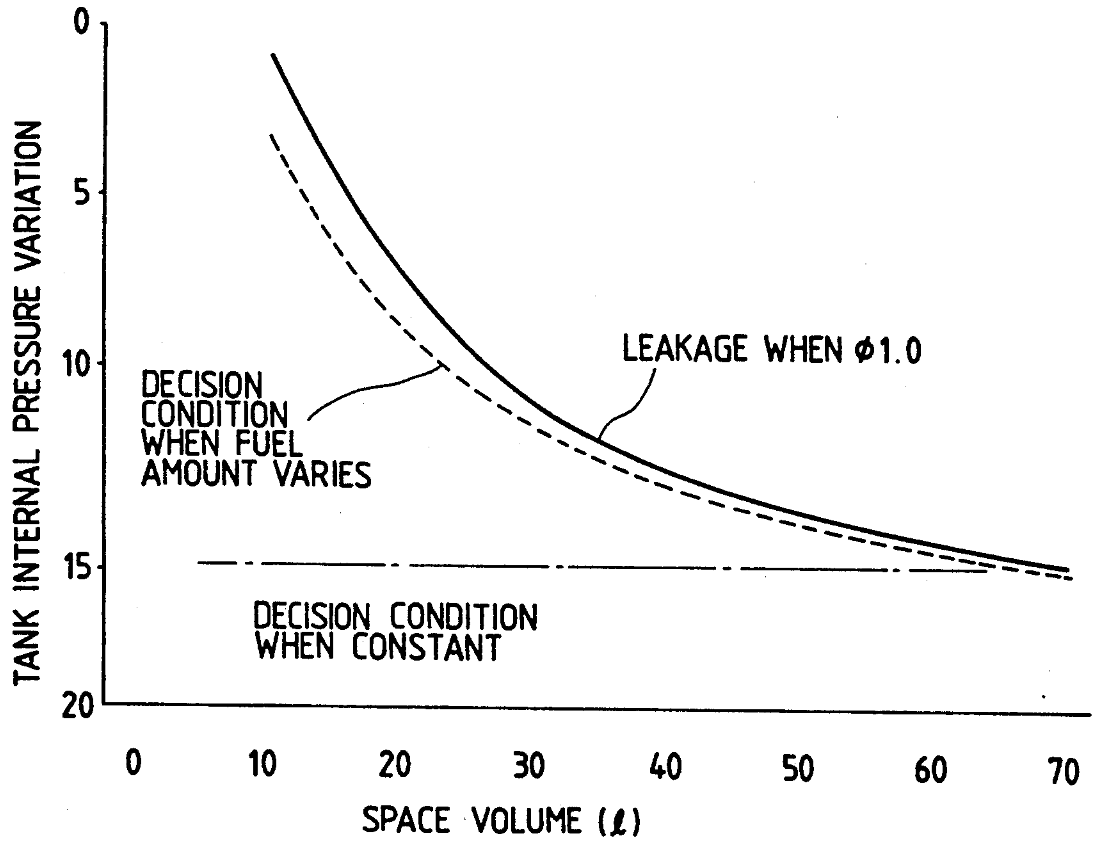
FIG. 20 is a graphic illustration for describing an eighth embodiment of this invention.
Figure 21:
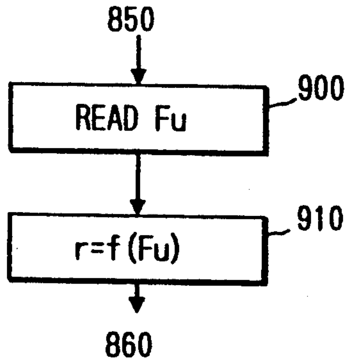
FIG. 21 is a flow chart showing an operation of an abnormality apparatus according to the eighth embodiment.

Still further, a description will be made hereinbelow in terms of an eighth embodiment of this invention which is a modification of the above-described sixth embodiment. Although in the step 860 of the flow chart of FIG. 13 the leakage decision condition (standard) is determined irrespective of the amount of the fuel within the fuel tank 22, as indicated by a solid line in FIG. 20, the tank internal pressure variation greatly changes in accordance with the volume of the fuel tank 22, i.e., the amount of the fuel within the fuel tank 22, even if the diameter of the leaking portion of the sealed passage from the fuel tank 22 to the control valve 40 is constant. Therefore, the supply abnormality decision is required to be made on the basis of whether the space volume is great (that is, the amount of the fuel is little). However, in the case that the space volume within the fuel tank 22 is small, that is, in the case that the fuel amount is large, there is the possibility that the pressure variation occurring when the leakage diameter is small results in an excessive abnormality decision. Thus, the decision of the leakage diameter is required to be made with the leakage decision condition being changed in accordance with the amount of the fuel as indicated by a dotted line in FIG. 20. For this control, as shown in FIG. 21, steps 900 and 910 are added between the steps 850 and the step 860 in FIG. 13. That is, the step 900 is for reading the amount Fu of the fuel existing within the fuel tank 22 on the basis of the output of the fuel sender 255 (see FIG. 19) and the step 910 is for obtaining a correction coefficient $\gamma$ (in advance stored) corresponding to the space volume of the fuel tank 22 on the basis of the read fuel amount Fu. Thereafter, in the step 860 the decision of the occurrence of the leakage is made when satisfying a condition $\Delta P2 > \alpha \bullet \Delta P1 + \beta + \gamma$. Here, the correction coefficient $\gamma$ is set so that the decision condition is changed as indicated by the dotted line in FIG. 20, that is, so that it becomes greater as the space volume becomes larger.

Moreover, a ninth embodiment of this invention will be described hereinbelow. This ninth embodiment relates to an abnormality detection in the case that the motor vehicle is running and also performs an operation similar to the operation as illustrated in FIG. 21. One feature of this ninth embodiment is to detect, on the basis of the output signal of the fuel sender 255, the variation of the tank internal pressure occurring when the motor vehicle is running or turning so as to determine whether the abnormality detection is possible. More specifically, the output of the fuel sender 255 is inputted to the CPU 52 of the ECU 50 so as to check whether the output of the fuel sender 255 is in a predetermined range at every predetermined time interval (for example, 256 ms) from the start of the abnormality detection operation or for the time period of the calculation of ΔP1 or ΔP2. When the output of the fuel sender 255 is out of the predetermined range, the abnormality detection operation is stopped immediately. The aforementioned predetermined range is determined by giving the same width to the + and − sides with respect to the output value (the reference value) of the fuel sender 255 obtained at the time of the start of the abnormality detection operation. It is also appropriate that the predetermined range is determined with the average value of the output values of the fuel sender 255 obtained during the calculation of ΔP1 or ΔP2 being set as the reference value. In this case, the decision as to the abnormality decision possibility is made only during the calculation of ΔP1 or ΔP2.

Figure 22:
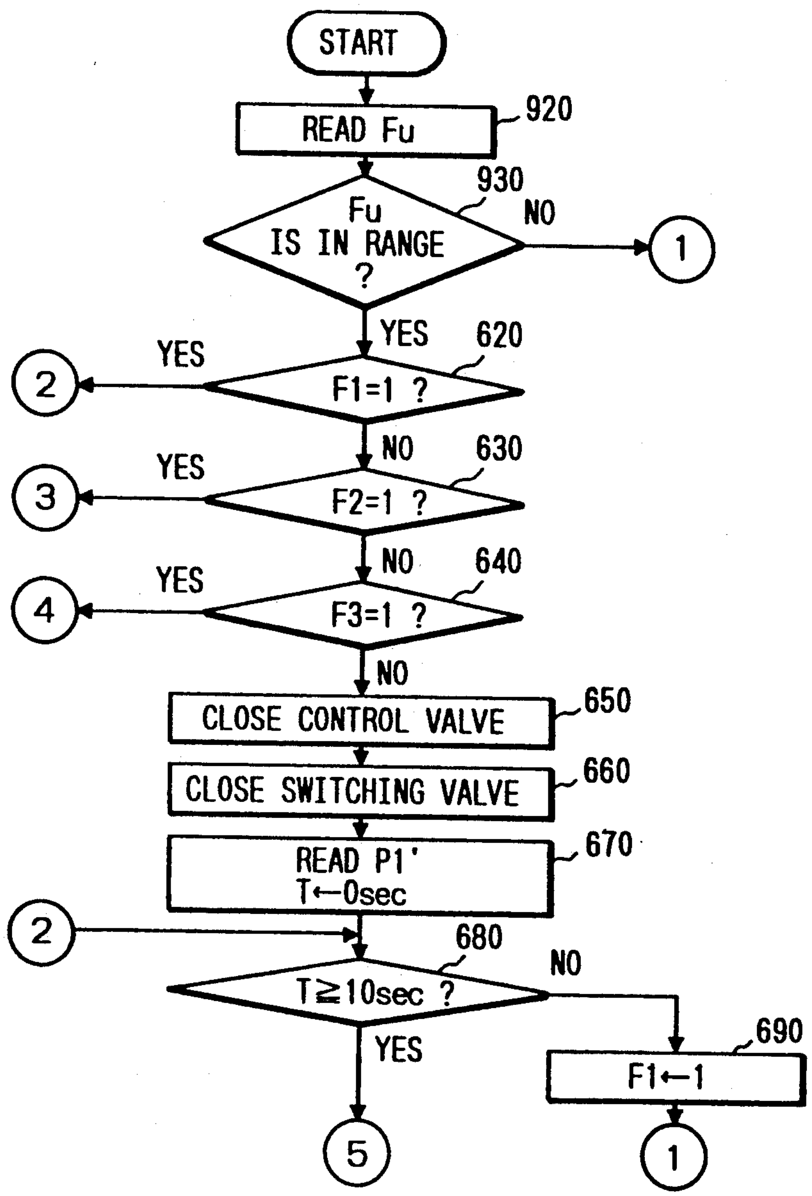
FIG. 22 is a flow chart for describing a ninth embodiment of this invention.

The operation of the ninth embodiment will be described hereinbelow with reference to a flow chart of FIG. 22 where steps corresponding to those in FIG. 12 are marked with the same numerals and the description omitted for brevity. In FIG. 22, in a step 920 the fuel amount Fu within the fuel tank 22 is read on the basis of the output of the fuel sender 255 and in a step 930 it is checked whether the fuel amount Fu is in a predetermined range, thereby checking whether the abnormality detection is possible. If the answer of the step 930 is "YES", the control advances to the step 620 to perform an operation similar to the operation in FIG. 12. On the other hand, if the answer of the step 930 is "NO", this routine terminates as it is. Although in this embodiment the output of the fuel sender 255 is continuously checked from the start of the abnormality detection operation up to the completion thereof, in the case that the decision is made only during the calculation of ΔP1 or ΔP2, an operation corresponding to the step 920 is effected before reading the respective pressures.

Figure 23:
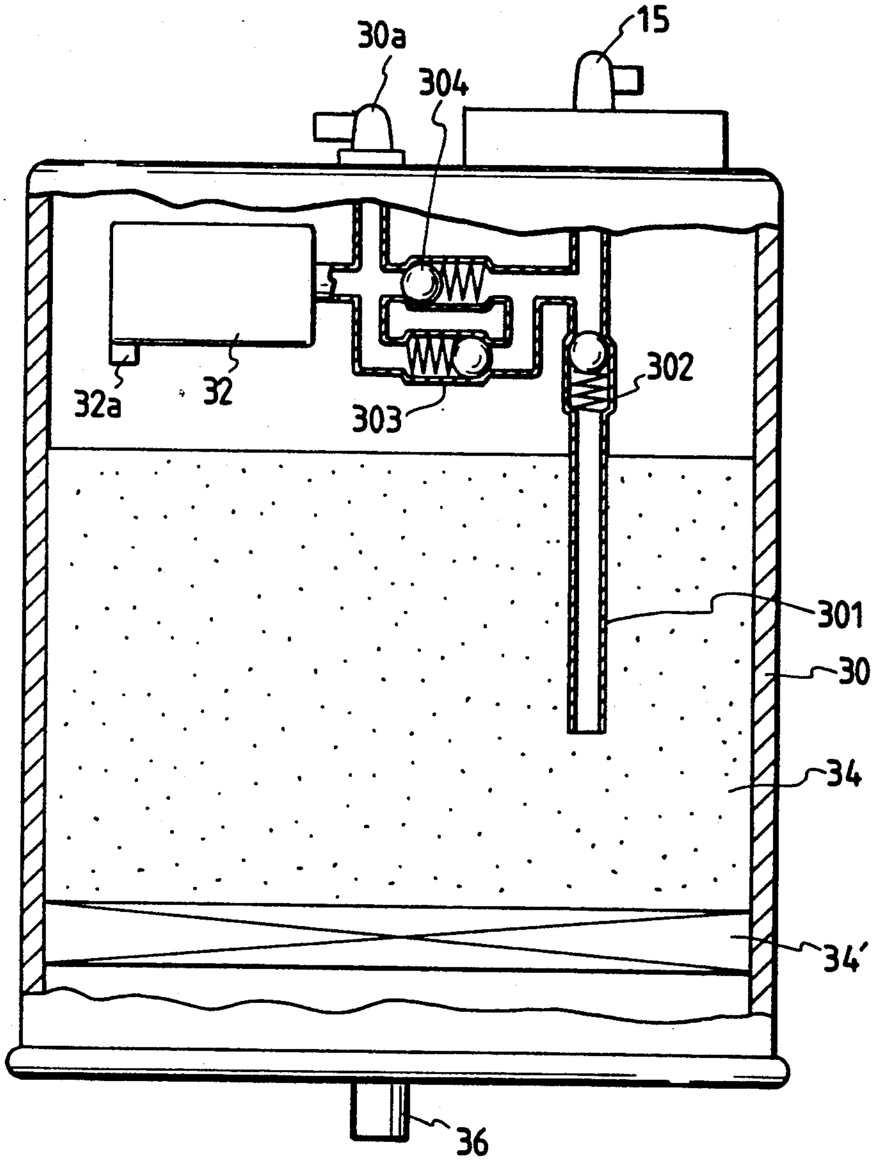
FIG. 23 shows a structure of a canister portion of an abnormality detecting apparatus according to a tenth embodiment of this invention.

FIG. 23 shows an arrangement of a canister portion of an abnormality detecting apparatus according to a tenth embodiment of this invention, which canister portion is used in place of the canister 30 and the switching valve 32 in FIG. 8A. In FIG. 23, a first check valve 302 is provided in an inlet pipe 301 coupling an inlet port 15 of a canister 30 to an absorbing device 34. This first check valve 302 is arranged to open when the pressure within a fuel tank 22 exceeds the atmosphere pressure by above a predetermined value (for example, 15 mmHg), whereby the fuel gas within the fuel tank 22 is introduced into the canister 30. In addition, the inlet pipe 302 is coupled through second and third check valves 303 and 304 to an outlet port 30*a* of the canister 30. These second and third check valves 303 and 304 are disposed in parallel to each other so as to be operable in directions opposite to each other. Moreover, the outlet port 30*a* is coupled through a switching valve 32 to a suction port 32*a*.

According to this tenth embodiment, the switching valve 32 takes an opening state to communicate the suction port 32*a* with the outlet port 30*a* when the motor vehicle is in a normal running state, and therefore the large intake pipe negative pressure (above 100 mmHg) from the internal combustion engine is introduced through the switching valve 32 and the suction port 32*a* into the canister 30, whereby the second check valve 303 takes the closing state. When the pressure within the fuel tank 22 exceeds the opening pressure of the first check valve 302 in response to generation of the fuel gas caused by increase in the temperature within the fuel tank 22, the first check valve 302 takes the opening state so that the fuel gas within the fuel tank 22 is absorbed by the absorbing device 34 of the canister 30. Here, the third check valve 304 takes the opening state when the pressure within the fuel tank 22 becomes lower by above a predetermined value (for example, 12 mmHg) than the atmosphere pressure, whereby air is introduced from an atmosphere-communicating portion 36 through the canister 30 into the fuel tank 22, thereby preventing the deformation of the fuel tank 22.

When the switching valve 32 is closed for the abnormality detection of the gas supply (purge) system, the large intake pipe negative pressure (for example, 100 mmHg) from the internal combustion engine is applied to the second check valve, and hence the second check valve takes the opening state so that the intake pipe negative pressure is supplied through the second check valve 303 into the fuel tank 22. At this time, since the fuel tank 22 side becomes a negative pressure, the first check valve 302 enters into the closing state to bypass the absorbing device 32 of the canister 30 to thereby seal the gas supply system.

Figure 24:
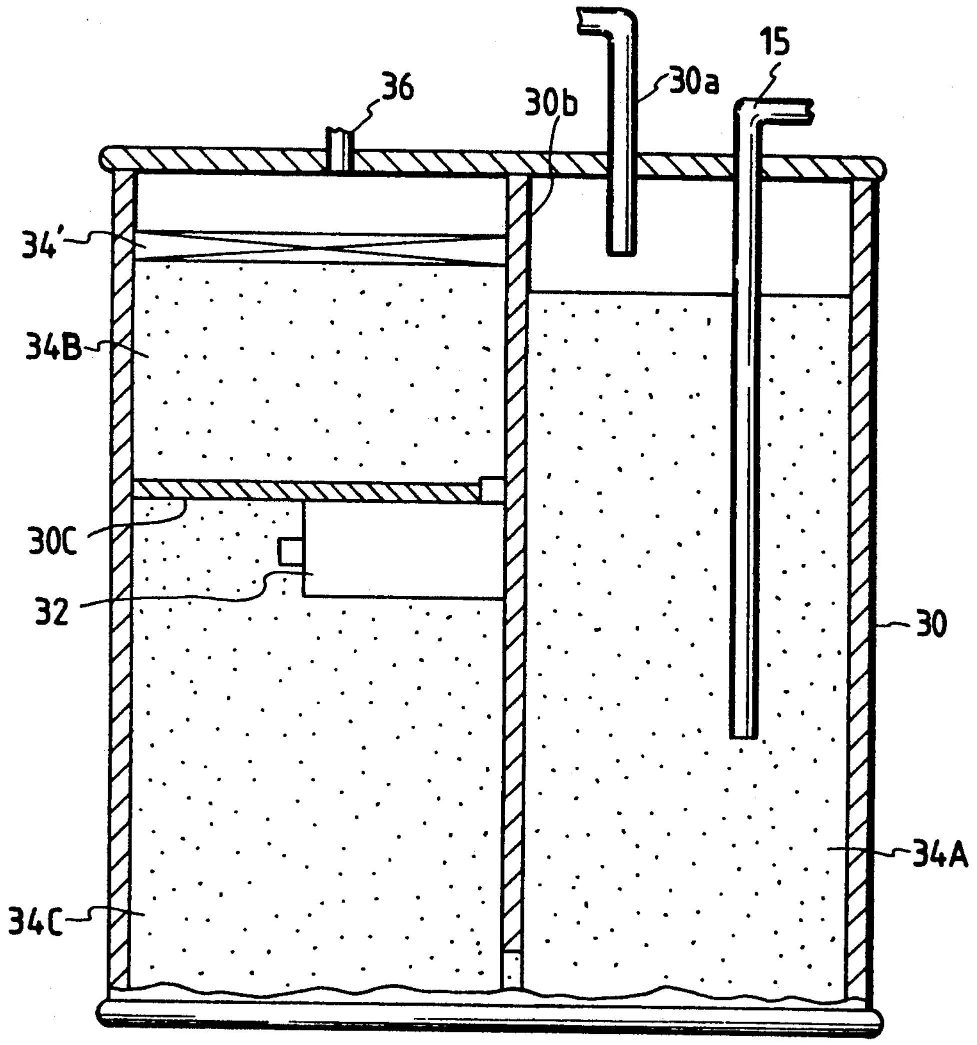
FIG. 24 illustrates a structure of a canister portion of an abnormality detecting apparatus according to an eleventh embodiment of this invention.

FIG. 24 shows an arrangement of a canister portion of an abnormality detecting apparatus according to an eleventh embodiment of this invention, which is used in place of the canister 30 and the switching valve 32. In FIG. 24, partitions 30*b* and 30*c* are provided within a canister 30 so that the canister 30 is divided into three chambers 34A to 34C. Here, the two chambers 34A and 34C are in communication with each other. In other words, the canister 30 is substantially divided into two chambers. In each of the divided chambers 34A to 34C there is provided an absorbing device (34). Thus, this canister portion substantially comprises two canisters (30). In the chamber 34B, a filter 34' is provided on the upper surface of the absorbing device so as to face an atmosphere-communicating portion 36. In addition, the chamber 34B is communicated through a switching valve 32 with the other chambers 34C and 34A.

In each of the control operations for the embodiments of FIGS. 23 and 24, some of the operations illustrated in FIGS. 9 to 13, 21 and 22 are used.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example, although in this embodiment the rare magnet is used, it is appropriate to use a ferrite magnet. Further, it is appropriate that the pressure sensor 44 is disposed at a portion between the canister 30 and the intake pipe 2, because the presence or absence of the leakage of the pressure in the entire sealed portion can similarly be detected on the basis of the pressure variation state. In addition, although in the above-described embodiment the measurement start pressure adjustment is effected by the opening and closing operation of the control valve 40, this invention is not limited to this method. Moreover, although in the embodiment the pressure variation ΔP1 is compared with the pressure variation ΔP2 for the abnormality detection, it is appropriate that two pressure variations from a positive pressure higher than the atmosphere pressure are compared with each other or two pressure variations from a negative pressure are compared with each other. That is, the leaking velocity from the broken portion is different if the pressure value at the time of the measurement start is different, it is possible to detect the occurrence of the leakage on the basis of the difference between the leaking velocities.

What is claimed is:

1. A fuel transpiration prevention system for preventing transpiration of a fuel gas generated by fuel encased within a liquid fuel tank and supplied to an internal combustion engine, said apparatus comprising:

a fuel gas supply system including:

canister means encasing an absorbing device for absorbing said fuel gas generated within said fuel tank;

first passage means provided between said canister means and said fuel tank for introducing said fuel gas from said fuel tank to said canister means;

second passage means provided between said canister and an intake pipe of said internal combustion engine for leading the fuel gas absorbed by said absorbing device into said intake pipe of said internal combustion engine due to a negative pressure generated within said intake pipe;

valve means provided in said second passage means for opening and closing said second passage in accordance with an operating condition of said internal combustion engine;

pressure detecting means for detecting a pressure within said fuel tank and generating a signal indicative of the detected pressure;

deviation calculating means responsive to said signal generated from said pressure detecting means for calculating a deviation between the pressure detected when said valve means opens said second passage means and the pressure detected when said valve means closes said second passage means; and abnormality decision means for deciding an abnormality of said fuel gas supply system on the basis of said deviation calculated by said deviation calculating means.

2. A system as claimed in claim 1, wherein said pressure detecting means comprises a displacement member arranged so as to be displaced in accordance with said detected pressure, a magnetic member attached to said displacement member, and Hall element means arranged so as to change its output in accordance with the displacement of said displacement member.

3. A fuel transpiration prevention system for preventing transpiration of a fuel gas generated by fuel encased within a liquid fuel tank and supplied to an internal combustion engine, said system comprising:

pressure detecting means for detecting a pressure within said fuel tank;

canister means encasing an absorbing device for absorbing said fuel gas generated within said fuel tank;

first supply passage means for introducing said fuel gas from said fuel tank to said canister means;

pressure adjusting valve means for keeping a pressure within said canister in a predetermined range;

second supply passage means for leading the fuel gas absorbed by said absorbing device into an intake pipe of said internal combustion engine;

control valve means provided within said second supply passage means and arranged to open and close in accordance with an operating condition of said internal combustion engine; and supply abnormality detecting means for detecting an abnormality in a supply of said fuel gas to said intake pipe due to an abnormality in at least one of said canister, said first supply passage means, said second supply passage means, said control valve means and said fuel tank, on the basis of said detected pressure obtained when said control valve means takes opening and closing states.

4. A system as claimed in claim 3, wherein said pressure detecting means comprises a displacement member arranged so as to be displaced in accordance with said detected pressure, a magnetic member attached to said displacement member, and Hall element means arranged so as to change its output in accordance with the displacement of said displacement member.

5. A system as claimed in claim 3, wherein said pressure adjusting valve means comprises a first adjusting valve which takes an opening state when a pressure within said canister exceeds a predetermined value, and a second adjusting valve which takes an opening state when the pressure within said canister becomes a negative pressure below a predetermined value.

6. A fuel transpiration prevention system for preventing transpiration of a fuel gas generated by fuel encased within a liquid fuel tank and supplied to an internal combustion engine, said apparatus comprising:

a fuel gas supply system including:

canister means encasing an absorbing device for absorbing said fuel gas generated within said fuel tank and further having an opening in communication with an atmosphere;

first passage means provided between said canister and said fuel tank for introducing said fuel gas from said fuel tank to said canister means;

second passage means provided between said canister and an intake pipe of said internal combustion engine for leading the fuel gas absorbed by said absorbing device into said intake pipe of said internal combustion engine due to a negative pressure generated within said intake pipe; and first valve means provided in said second passage means for opening and closing said second passage in accordance with an operating condition of said internal combustion engine;

pressure detecting means for detecting a pressure within said fuel tank and generating a signal indicative of the detected pressure;

second valve means for opening and closing said atmosphere-communicated opening of said canister;

deviation calculating means responsive to said signal generated from said pressure detecting means for calculating a deviation between the pressure detected when said first valve means opens said second passage means and said second valve means opens said atmosphere-communicated opening and the pressure detected when said first valve means opens said second passage means and said second valve means closes said atmosphere-communicated opening; and abnormality decision means for deciding an abnormality of said fuel gas supply system on the basis of said deviation calculated by said deviation calculating means.

7. A system as claimed in claim 6, wherein said pressure detecting means comprises a displacement member arranged so as to be displaced in accordance with said detected pressure, a magnetic member attached to said displacement member, and Hall element means arranged so as to change its output in accordance with the displacement of said displacement member.

8. A fuel transpiration prevention system for preventing transpiration of a fuel gas generated by fuel encased within a liquid fuel tank and supplied to an internal combustion engine, said apparatus comprising:

a fuel gas supply system including:

canister means encasing an absorbing device for absorbing said fuel gas generated within said fuel tank;

first passage means provided between said canister and said fuel tank for introducing said fuel gas from said fuel tank to said canister means;

second passage means provided between said canister and an intake pipe of said internal combustion engine for leading the fuel gas absorbed by said absorbing device into said intake pipe of said internal combustion engine due to a negative pressure generated within said intake pipe; and valve means provided in said second passage means for opening and closing said second passage in accordance with an operating condition of said internal combustion engine;

pressure detecting means for detecting a pressure within said fuel tank and generating a signal indicative of the detected pressure;

bypass control means provided between said first and second passage means for allowing a direct communication to be established between said first and second passage means so as to by-pass said canister;

deviation calculating means responsive to said signal generated from said pressure detecting means for calculating a deviation between the pressure detected when said valve means opens said second passage means and said bypass control means bypasses said canister and the pressure detected when said valve means opens said second passage means and said bypass control means does not by-pass said canister; and abnormality decision means for deciding an abnormality of said fuel gas supply system on the basis of said deviation calculated by said deviation calculating means.

9. A system as claimed in claim 8, wherein said pressure detecting means comprises a displacement member arranged so as to be displaced in accordance with said detected pressure, a magnetic member attached to said displacement member, and Hall element means arranged to change its output in accordance with the displacement of said displacement member.

10. An apparatus for detecting an abnormality of a fuel transpiration prevention system which includes a canister with an absorbing device and a control valve provided in a passage between a fuel tank and an intake pipe of an internal combustion engine so that a fuel gas generated within said fuel tank is absorbed by said absorbing device of said canister and introduced into said intake pipe by opening and closing said control valve in accordance with an operating state of said internal combustion engine, said apparatus comprising:

pressure detecting means for detecting a pressure within said fuel transpiration prevention system;

switching valve means for opening and closing an opening of said canister which communicates with an atmosphere;

sealing means for closing both said control valve and switching valve means so as to seal said fuel transpiration prevention system;

pressure adjusting means for adjusting a pressure within the sealed fuel transpiration prevention system to predetermined pressures;

pressure variation detecting means responsive to an output of said pressure detecting means for detecting predetermined pressure variation states while said pressure adjusting means adjusts the pressure within the sealed system or after said pressure adjusting means has adjusted the pressure within the sealed system; and abnormality detecting means for detecting an abnormality of said fuel transpiration prevention system on the basis of said predetermined pressure variation state detected by said pressure variation detecting means.

11. An apparatus as claimed in claim 10, wherein said pressure adjusting means selectively adjusts the pressure within the sealed system to a first predetermined pressure and a second predetermined pressure, said pressure variation detecting means detects a first pressure variation state after the pressure within the sealed system is adjusted to said first predetermined pressure and further detects a second pressure variation state after the pressure within the sealed system is adjusted to said second predetermined pressure, and said abnormality detecting means compares said first pressure variation state with said second pressure variation state to detect the abnormality of said fuel transpiration prevention system on the basis of a comparison result between said first and second pressure variation states.

12. An apparatus as claimed in claim 10, wherein said pressure adjusting means introduces a negative pressure from said intake pipe into said fuel transpiration prevention system, said pressure variation detecting means detects a pressure variation state when said negative pressure is introduced thereinto, and said abnormality detecting means detects the abnormality of said fuel transpiration prevention system on the basis of the pressure variation state detected when said negative pressure is introduced thereinto.

13. An apparatus as claimed in claim 10, wherein said pressure detecting means is provided in an interval between said fuel tank and said canister.

14. An apparatus as claimed in claim 10, wherein said pressure detecting means comprises a displacement member arranged so as to be displaced in accordance with said detected pressure, a magnetic member attached to said displacement member, and Hall element means arranged so as to change its output in accordance with the displacement of said displacement member.

15. An apparatus as claimed in claim 10, further comprising fuel amount detecting means for detecting an amount of fuel within said fuel tank, and abnormality decision condition controlling means for changing a decision condition, by which said abnormality detecting means detects the abnormality of said fuel transpiration prevention system, in accordance with the fuel amount detected by said fuel amount detecting means.

16. An apparatus as claimed in claim 10, further comprising fuel amount detecting means for detecting an amount of fuel within said fuel tank, and fuel variation detecting means for checking whether the fuel amount detected by said fuel amount detecting means varies, and for substantially making void the abnormality detection of said abnormality detecting means when the detected fuel amount varies.

17. An apparatus as claimed in claim 10, wherein said canister substantially comprises two portions which are communicated with each other through said switching valve means.

18. An apparatus as claimed in claim 10, wherein said switching valve means is provided within said canister, and when said switching valve means takes a closing state, an inlet port and an outlet port of said canister are communicated with each other so as to bypass said absorbing device.

* * * * *